(12) United States Patent
Niwa et al.

(10) Patent No.: US 11,781,511 B2
(45) Date of Patent: Oct. 10, 2023

(54) FUEL SUPPLY DEVICE

(71) Applicants: AISAN KOGYO KABUSHIKI KAISHA, Obu (JP); TOYOTA JIDOSHA KABUSHIKI KAISHA, Toyota (JP)

(72) Inventors: Kensuke Niwa, Nagoya (JP); Koji Yoshida, Kasugai (JP); Akira Iida, Tokai (JP); Shinya Higashi, Kasugai (JP); Morihiro Takemura, Nisshin (JP); Hiroyasu Kariya, Kariya (JP); Tatsuki Fukui, Novi, MI (US); Takuhito Fujiwara, Obu (JP); Takeaki Morizono, Tsushima (JP); Takehiro Yamauchi, Obu (JP); Ryosuke Hayashi, Toyota (JP)

(73) Assignees: AISAN KOGYO KABUSHIKI KAISHA, Obu (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 627 days.

(21) Appl. No.: 16/350,072

(22) PCT Filed: Jan. 13, 2017

(86) PCT No.: PCT/JP2017/001013
§ 371 (c)(1),
(2) Date: Aug. 20, 2018

(87) PCT Pub. No.: WO2017/141596
PCT Pub. Date: Aug. 24, 2017

(65) Prior Publication Data
US 2019/0136810 A1   May 9, 2019

(30) Foreign Application Priority Data
Feb. 19, 2016   (JP) .................. 2016-029967

(51) Int. Cl.
*F02M 37/10*   (2006.01)
*F02M 37/50*   (2019.01)
*B60K 15/03*   (2006.01)

(52) U.S. Cl.
CPC ........... *F02M 37/103* (2013.01); *B60K 15/03* (2013.01); *F02M 37/10* (2013.01);
(Continued)

(58) Field of Classification Search
CPC .... F02M 37/103; F02M 37/50; F02M 37/106; B60K 15/03; B60K 2015/03236; B60K 2015/03243
(Continued)

(56) References Cited

U.S. PATENT DOCUMENTS 3,171,643 A * 3/1965 Roos ................. F16F 9/585
267/64.15
4,747,388 A * 5/1988 Tuckey ............... F02M 37/106
137/574

(Continued)

FOREIGN PATENT DOCUMENTS

DE   10 027 991 A1   12/2001
DE   10 329 104 A1   2/2004
(Continued)

OTHER PUBLICATIONS

NPL_2002FuelPumpFilterPart2; Video Published to YouTube on Oct. 31, 2012 by username "BurbanMilitia"; retreived from the internet Sep. 21, 2019; URL: https://www.youtube.com/watch?v=NKPnAYfxIRE&t=328s (Year: 2002).*

(Continued)

*Primary Examiner* — Sizo B Vilakazi
*Assistant Examiner* — Brian R Kirby
(74) *Attorney, Agent, or Firm* — CONLEY ROSE, P.C.

(57) ABSTRACT

A fuel supply device includes a flange unit and a pump unit. The flange unit includes a flange main body for closing an
(Continued)

opening formed in an upper wall of a fuel tank. The pump unit includes a joint member that is connected to the flange main body so that both components may be movable relative to each other in the vertical direction. The interval in the vertical direction between the flange main body and the joint member is restricted from going below a minimum vertical interval. The minimum interval occurs when a stand-off portion provided as part of the flange main body and a connecting plate portion provided as part of the joint member come into mutual contact with each other and abut each other in the vertical direction.

4 Claims, 16 Drawing Sheets

(52) U.S. Cl.
CPC .......... *F02M 37/106* (2013.01); *F02M 37/50* (2019.01); *B60K 2015/03236* (2013.01); *B60K 2015/03243* (2013.01)

(58) Field of Classification Search
USPC ....................................................... 123/509
See application file for complete search history.

(56) References Cited

U.S. PATENT DOCUMENTS

| | | | | | |
|---|---|---|---|---|---|
| 4,747,587 | A * | 5/1988 | Ferrel | ................ | B60G 13/003 |
| | | | | | 280/124.155 |
| 4,869,225 | A * | 9/1989 | Nagata | ................ | F02M 37/106 |
| | | | | | 123/514 |
| 4,945,884 | A * | 8/1990 | Coha | ................ | F02M 37/103 |
| | | | | | 123/514 |
| 4,962,916 | A * | 10/1990 | Palinkas | ................ | F16F 1/373 |
| | | | | | 267/293 |
| 5,080,077 | A * | 1/1992 | Sawert | ................ | F02M 37/02 |
| | | | | | 137/574 |
| 5,157,806 | A * | 10/1992 | Wartian | ................ | F16F 9/516 |
| | | | | | 16/84 |
| 5,195,494 | A * | 3/1993 | Tuckey | ................ | F02M 37/44 |
| | | | | | 123/514 |
| 5,522,425 | A * | 6/1996 | Kroiss | ................ | G01F 23/36 |
| | | | | | 137/565.17 |
| 5,678,449 | A * | 10/1997 | Mollet | ................ | F02M 37/10 |
| | | | | | 73/317 |
| 5,680,847 | A * | 10/1997 | Begley | ................ | F02M 37/103 |
| | | | | | 123/509 |
| 5,797,595 | A * | 8/1998 | Buma | ................ | B60G 15/12 |
| | | | | | 267/64.27 |
| 6,149,399 | A * | 11/2000 | Bowser | ................ | F02M 37/103 |
| | | | | | 417/279 |
| 6,155,793 | A * | 12/2000 | Tuckey | ................ | F02M 37/106 |
| | | | | | 417/89 |
| 6,206,037 | B1 * | 3/2001 | Murakoshi | ................ | F02M 37/106 |
| | | | | | 137/565.22 |
| 6,213,100 | B1 * | 4/2001 | Johansen | ................ | F02M 37/20 |
| | | | | | 137/202 |
| 6,216,908 | B1 * | 4/2001 | Hutter | ................ | B60K 15/077 |
| | | | | | 220/478 |
| 6,230,690 | B1 * | 5/2001 | Umetsu | ................ | B60K 15/077 |
| | | | | | 123/509 |
| 6,260,543 | B1 * | 7/2001 | Chih | ................ | F02M 37/106 |
| | | | | | 137/574 |
| 6,328,063 | B1 * | 12/2001 | Tistchenko | ................ | B01D 35/027 |
| | | | | | 123/514 |
| 6,361,027 | B1 * | 3/2002 | Lun | ................ | F16F 9/54 |
| | | | | | 267/64.19 |
| 6,401,751 | B2 * | 6/2002 | Murakoshi | ................ | B60K 15/077 |
| | | | | | 123/509 |
| 6,598,594 | B2 * | 7/2003 | Takahashi | ................ | F02M 37/103 |
| | | | | | 123/514 |
| 6,604,511 | B2 * | 8/2003 | Hazama | ................ | F02M 37/103 |
| | | | | | 123/198 D |
| 6,619,272 | B2 * | 9/2003 | Jones | ................ | F02M 37/025 |
| | | | | | 417/198 |
| 6,640,832 | B2 * | 11/2003 | Walter | ................ | B60K 15/077 |
| | | | | | 210/232 |
| 6,716,000 | B2 * | 4/2004 | Appleton | ................ | F02M 37/103 |
| | | | | | 417/423.15 |
| 6,752,129 | B2 * | 6/2004 | Isozaki | ................ | F02M 37/103 |
| | | | | | 417/363 |
| 6,863,814 | B2 | 3/2005 | Okabe et al. | | |
| 6,877,522 | B2 * | 4/2005 | Dasilva | ................ | F02M 37/103 |
| | | | | | 137/15.01 |
| 6,880,569 | B2 * | 4/2005 | Kato | ................ | F02M 37/50 |
| | | | | | 123/514 |
| 6,886,542 | B2 * | 5/2005 | Yamada | ................ | B01D 35/26 |
| | | | | | 123/509 |
| 6,893,011 | B2 * | 5/2005 | Schudt | ................ | B60G 15/068 |
| | | | | | 188/377 |
| 6,913,253 | B2 * | 7/2005 | Mennesson | ................ | B60G 15/065 |
| | | | | | 188/321.11 |
| 6,928,989 | B2 * | 8/2005 | Powell | ................ | F02M 37/18 |
| | | | | | 123/514 |
| 6,941,808 | B2 * | 9/2005 | Gouzou | ................ | F02M 37/103 |
| | | | | | 73/317 |
| 6,964,264 | B2 * | 11/2005 | Yoshioka | ................ | F02M 37/50 |
| | | | | | 123/514 |
| 7,059,305 | B2 * | 6/2006 | Knaggs | ................ | B60K 15/03519 |
| | | | | | 137/587 |
| 7,066,455 | B2 * | 6/2006 | Adoline | ................ | F16F 1/128 |
| | | | | | 267/168 |
| 7,108,487 | B2 * | 9/2006 | Koba | ................ | F02M 37/103 |
| | | | | | 417/360 |
| 7,124,748 | B2 * | 10/2006 | Gaffield | ................ | F02M 37/0094 |
| | | | | | 123/509 |
| 7,143,750 | B2 * | 12/2006 | Brunel | ................ | B60K 15/03504 |
| | | | | | 123/518 |
| 7,159,573 | B2 * | 1/2007 | Okada | ................ | B01D 35/26 |
| | | | | | 123/198 D |
| 7,159,576 | B2 * | 1/2007 | Yamashita | ................ | F02M 37/103 |
| | | | | | 123/519 |
| 7,159,578 | B2 * | 1/2007 | Horvath | ................ | F02M 37/20 |
| | | | | | 123/518 |
| 7,198,035 | B2 * | 4/2007 | Kadler | ................ | F02M 37/106 |
| | | | | | 210/416.4 |
| 7,216,633 | B2 * | 5/2007 | Attwood | ................ | F02M 37/025 |
| | | | | | 137/571 |
| 7,219,658 | B2 * | 5/2007 | Torii | ................ | F02M 37/025 |
| | | | | | 123/509 |
| 7,249,594 | B2 | 7/2007 | Hashiguchi | | |
| 7,281,705 | B2 * | 10/2007 | Huprikar | ................ | B60G 11/54 |
| | | | | | 267/293 |
| 7,305,973 | B2 * | 12/2007 | Okazono | ................ | F02M 37/106 |
| | | | | | 123/509 |
| 7,415,974 | B2 * | 8/2008 | Akiba | ................ | F02M 37/106 |
| | | | | | 123/511 |
| 7,472,693 | B2 * | 1/2009 | Izutani | ................ | F02M 37/103 |
| | | | | | 123/509 |
| 7,520,270 | B2 * | 4/2009 | Uhara | ................ | F02M 37/106 |
| | | | | | 417/423.3 |
| 7,523,746 | B2 * | 4/2009 | Brusoe | ................ | F02M 37/50 |
| | | | | | 123/509 |
| 7,556,024 | B2 * | 7/2009 | Crary | ................ | F02M 37/103 |
| | | | | | 123/495 |
| 7,690,359 | B2 * | 4/2010 | Price | ................ | F02M 37/103 |
| | | | | | 123/509 |
| 7,800,883 | B2 * | 9/2010 | Nederegger | ......... | F02M 37/103 |
| | | | | | 123/509 |
| 7,819,108 | B2 * | 10/2010 | Froehlich | ................ | F02M 37/106 |
| | | | | | 123/509 |
| 8,353,422 | B2 * | 1/2013 | Malec | ................ | F02M 37/103 |
| | | | | | 220/567.2 |
| 8,689,827 | B2 * | 4/2014 | Okazono | ................ | B01D 35/027 |
| | | | | | 137/565.37 |
| 8,919,326 | B2 * | 12/2014 | Lim | ................ | F02M 37/103 |
| | | | | | 137/565.22 |

(56) References Cited

U.S. PATENT DOCUMENTS

| | | | |
|---|---|---|---|
| 9,132,366 B2* | 9/2015 | Ueki | F02M 37/44 |
| 9,328,704 B2 | 5/2016 | Okazono et al. | |
| 9,470,192 B2 | 10/2016 | Honda | |
| 9,539,893 B2* | 1/2017 | Hsu | B60K 15/04 |
| 9,951,729 B2* | 4/2018 | Fukui | F02M 37/103 |
| 2002/0014225 A1* | 2/2002 | Ushigome | F02M 37/44 |
| | | | 123/514 |
| 2003/0056769 A1* | 3/2003 | McGrath | F02M 37/106 |
| | | | 123/511 |
| 2003/0106537 A1* | 6/2003 | Isozaki | F02M 37/103 |
| | | | 417/363 |
| 2003/0136507 A1* | 7/2003 | Thiel | F02M 37/106 |
| | | | 156/293 |
| 2003/0189277 A1* | 10/2003 | Koberstein | F16F 9/36 |
| | | | 267/286 |
| 2004/0168678 A1* | 9/2004 | Yamada | F02M 37/46 |
| | | | 137/572 |
| 2005/0012256 A1* | 1/2005 | Huprikar | F16F 9/58 |
| | | | 267/141 |
| 2005/0029719 A1* | 2/2005 | Adoline | F16F 3/06 |
| | | | 267/286 |
| 2005/0150826 A1* | 7/2005 | Sato | B01D 35/0273 |
| | | | 210/488 |
| 2005/0201877 A1* | 9/2005 | Mitsudou | F02M 37/103 |
| | | | 417/423.3 |
| 2006/0073029 A1* | 4/2006 | Torii | F02M 37/44 |
| | | | 417/360 |
| 2006/0137662 A1* | 6/2006 | Matsumoto | F02M 37/103 |
| | | | 123/509 |
| 2006/0138035 A1* | 6/2006 | Izutani | F02M 37/50 |
| | | | 210/172.3 |
| 2006/0208404 A1* | 9/2006 | Cmich | B60G 15/12 |
| | | | 267/64.27 |
| 2007/0025866 A1* | 2/2007 | Douyama | F04B 53/22 |
| | | | 417/423.3 |
| 2007/0163659 A1* | 7/2007 | Uhara | B60K 15/077 |
| | | | 137/565.17 |
| 2008/0216801 A1* | 9/2008 | Kanamaru | B01D 35/26 |
| | | | 123/511 |
| 2009/0028690 A1* | 1/2009 | Kawajiri | F02M 37/048 |
| | | | 415/55.1 |
| 2009/0165753 A1* | 7/2009 | Froehlich | F02M 37/103 |
| | | | 123/509 |
| 2010/0327548 A1* | 12/2010 | Falkner | F16F 1/445 |
| | | | 280/124.1 |
| 2011/0204625 A1* | 8/2011 | Cho | F02M 37/50 |
| | | | 264/259 |
| 2012/0060948 A1* | 3/2012 | Okazono | B60K 15/077 |
| | | | 137/565.17 |
| 2012/0074660 A1* | 3/2012 | Thomas | B60G 17/021 |
| | | | 280/5.514 |
| 2012/0112112 A1* | 5/2012 | McCarty | F16K 31/1221 |
| | | | 251/324 |
| 2012/0247590 A1* | 10/2012 | Powell | F02M 37/103 |
| | | | 137/565.01 |
| 2013/0014853 A1 | 1/2013 | Hunt et al. | |
| 2013/0133765 A1* | 5/2013 | Israelson | F04D 29/086 |
| | | | 137/565.13 |
| 2013/0239931 A1* | 9/2013 | Kimoto | F02M 25/06 |
| | | | 123/520 |
| 2014/0116398 A1* | 5/2014 | Jeon | F02M 37/106 |
| | | | 123/509 |

FOREIGN PATENT DOCUMENTS

| | | |
|---|---|---|
| DE | 10 2005 004 831 A1 | 9/2005 |
| DE | 10 2011 082 418 A1 | 3/2012 |
| JP | 2003172219 A | 6/2003 |
| JP | 2004138046 A | 5/2004 |
| JP | 2006002655 A | 1/2006 |
| JP | 2006342678 A | 12/2006 |
| JP | 2007190952 A | 8/2007 |
| JP | 2008184954 A | 8/2008 |
| JP | 2012-184760 A * | 9/2012 |
| JP | 2014126010 A | 7/2014 |
| KR | 101466038 B1 | 11/2014 |

OTHER PUBLICATIONS

2004AudiOEMFuelPumpAssembly.pdf; Retrieved from the internet Sep. 19, 2019; URL: https://www.ebay.com/itm/2003-2006-Audi-A4-1-8L-Cabriolet-Convertible-Fuel-Pump-Assembly-OEM/264378407779?fits=Model%3AA4%7CMake%3AAudi&hash=item3d8e2e5b63%3Ag%3Aj7sAAOSwFeNcqO%7EM%3Asc%3AUSPSPriorityMailLargeFlatRateBox%21 (Year: 2004).*

NPL_2002FuelPumpFilterPart2; Video Published to YouTube on Oct. 31, 2012 by username "BurbanMilitia"; retreived from the internet Sep. 21, 2019; URL: https://www.youtube.com/watch?v=NKPnAYfxIRE&t=328s (Year: 2012).*

AudiFuelPumpNPL; OEM Fuel Pump Module from 2005 Audi A4 1.8T; VIN: WAUJC68E35A110683; Examiner acquired actual unit from EBAY Listing As-Shown for Purpose of Providing Additional Complimentary Supporting Evidence that Prior Art Pump Device discloses Claimed functional limitations. (Year: 2005).*

Honda Fuel PumpNPL; OEM Fuel Pump Module from 2004 Honda Civic 1.7L; OEM Part No. 17040S5A930; Examiner acquired actual unit from EBAY Listing As-Shown for Purpose of Providing Additional Complimentary Supporting Evidence that Prior Art Pump Device discloses Claimed functional limitations. (Year: 2004).*

PCT/JP2017/001013 International Search Report and Written Opinion dated Mar. 7, 2017 (9 p.).

Indonesian Office Action dated Nov. 11, 2019, for Indonesian Application No. PID201806240 (2 p.).

English Translation of Indonesian Office Action dated Nov. 11, 2019, for Indonesian Application No. PID201806240 (2 p.).

Japanese Office Action dated Sep. 17, 2019, for Japanese Application No. 2016-029967 (3 p.).

English Translation of Japanese Office Action dated Sep. 17, 2019, for Japanese Application No. 2016-029967 (3 p.).

Japanese Office Action dated Dec. 24, 2019, for Japanese Application No. 2016-029967 (4 p.).

English Translation of Japanese Office Action dated Dec. 24, 2019, for Japanese Application No. 2016-029967 (4 p.).

Office Action dated May 15, 2020, for Indonesian Patent Application No. PID201806240 (5 p.).

Office Action dated Jun. 11, 2020, for Indian Patent Application No. 201817030733 (5 p.).

German Patent Application No. 11 2017 000 882.4 Office Action dated Aug. 2, 2021 (19 pages).

* cited by examiner

FUEL SUPPLY DEVICE

CROSS-REFERENCE TO RELATED APPLICATIONS

The present application is a 35 U.S.C. § 371 National Phase entry of, and claims priority to, PCT Application No. PCT/JP2017/001013, filed Jan. 13, 2017, which in turn claims priority to Japanese Patent Application No. 2016-029967, filed Feb. 19, 2016, both of which are incorporated by reference in their entireties for all purposes.

STATEMENT REGARDING FEDERALLY SPONSORED RESEARCH OR DEVELOPMENT

Not applicable.

BACKGROUND

The present disclosure relates to a fuel supply device configured to feed fuel from within a fuel tank into an internal combustion engine (for example, a vehicle engine).

A conventional example of the fuel supply device will be described. FIG. 18 is a partially removed side view of a fuel supply device. As shown in FIG. 18, the fuel supply device 500 includes a cover-side unit 502 and a pump-side unit 504. The cover-side unit 502 includes a cover member 509 for covering, enclosing, and plugging a circular opening 507 formed on and extending through an upper wall 506a of a fuel tank 506. A pair of vertical connecting shafts 511 are suspended from opposite diametrical ends of the cover member 509. The pump-side unit 504 includes a fuel pump 513 disposed within the fuel tank 506 and a sub-tank 515 configured to accommodate the fuel pump 513. The two connecting shafts 511 are connected to the sub-tank 515 so as to be able to move in an axial direction (vertical direction in FIG. 18). Two compression springs 517 are also provided, surrounding and enclosing said connect shafts 511 between the cover member 509 and the sub-tank 515 so as to bias these in a vertically outward direction to enlarge the space therebetween.

The fuel tank 506 may deform, i.e. expand or contract, in response to a variation of internal pressure within the tank, wherein the variation of the internal pressure in the tank may be caused by the variation of ambient temperature and/or the amount of fuel within the tank. This deformation may cause the height of the fuel tank 506 to vary so as to increase or decrease, varying the height interval between the upper wall 506a and a bottom wall 506b. In this case, the cover member 509 and the sub-tank 515 move relative to each other in the vertical direction to adjust to the variation between the upper wall 506a and the bottom wall 506b of the fuel tank 506. Consequently, despite deformation of the fuel tank 506, the sub-tank 515 is maintained in a state where it is pressed flush against the bottom wall 506b of the fuel tank 506 by a biasing force of the spring 517. Such a fuel supply device 500 is disclosed, for example, in Japanese-Laid-Open Patent Publication No. 2004-138046.

According to the conventional example described above, the fuel tank 506 could excessively contract height wise (in the vertical direction) due to the variation of the internal pressure in the tank. In this case, a lower end of one of the (left side in FIG. 18) connecting shafts 511 would come into contact with a protrusion 515a extending from a bottom portion of the sub-tank 515. This configuration may define a minimum height interval between the cover member 509 and the sub-tank 515. The cover member 509 is typically made of resin. The connecting shafts 511 are typically made of metal. Therefore, if the fuel tank 506 excessively contracts in the height direction, the lowermost end of the connecting shaft 511 comes into contact with the upper surface of protrusion 515a of the sub-tank 515 so that the stress from the contracting force is locally concentrated on the cover member 509. As a result, it is assumed that the cover member 509 may deform. Therefore, there has conventionally been a need for a fuel supply device that can suppress the deformation of the cover member of the cover-side unit while at the same time suppressing the excessive contraction of the fuel tank in the height direction.

BRIEF SUMMARY

According to one aspect of the present disclosure, a fuel supply device includes a cover-side unit, a pump-side unit, and a height interval restricting mechanism. The cover-side unit includes a cover member configured to enclose, surround, and plug an opening formed on and extending through the upper wall of a fuel tank. The pump-side unit includes a fuel pump disposed within the fuel tank and a joint portion movably connected to the cover member in the vertical direction. The height interval restricting mechanism includes an upper abutment portion provided at the cover member and a lower abutment portion provided at the joint portion. The minimum height interval between the cover member and the joint portion is restricted by the abutting of the upper abutment portion and the lower abutment portion. Therefore, in the event of excessive contraction of the fuel tank, the minimum height interval between the cover member and the joint portion can be restricted by the abutment of the upper abutment portion and the lower abutment portion of the interval restricting mechanism. Further, since the connecting shafts are not used to limit contraction of the fuel tank, the potential deformation of the cover member caused by the connecting shafts can be prevented. In particular, in embodiments described herein, the deformation of the cover member of the cover-side unit may be prevented while at the same time the excessive contraction of the fuel tank in the height direction may be prevented.

According to another aspect of the present disclosure, the upper abutment portion is vertically suspended from the cover member and is configured to have a shape that is tapered downward. This configuration can disperse stress applied to the cover member in an upwards and outwards manner wherein the stress is cause by the abutment between the upper abutment portion and the lower abutment portion of the interval restricting mechanism. As a result, deformation that may be caused by over-localization of stress concentrating in the cover member can be prevented.

According to another aspect of the present disclosure, the upper abutment portion is configured in a diagonally cut cylindrical shape. This configuration allows the upper abutment portion to be formed along an outer periphery of the cover member.

According to another aspect of the present disclosure, the cover member includes a fitting tubular portion that is fitted into the opening of the fuel tank. The upper abutment portion is formed utilizing at least a part of the fitting tubular portion. This configuration allows at least a part of the fitting tubular portion to be used as a part of the upper abutment portion.

According to another aspect of the present disclosure, a hollow section extending in the vertical direction is formed as part of the interior of the upper abutment portion. This configuration can reduce weight of the upper abutment portion when compared with the case where the upper abutment portion is formed as a solid body.

According to another aspect of the present disclosure, an electric connector is provided on the cover member. The fuel pump includes a connection connector connected to the electric connector. The connection connector is arranged at a higher position than the opening of the fuel tank when the pump-side unit is placed within the fuel tank and the height interval between the cover member and the joint portion is at its maximum. This configuration may prevent the connection connector from being caught between the opening edge around the opening of the fuel tank and the cover member when the fuel supply device is installed to the fuel tank.

DETAILED DESCRIPTION

Hereinafter, one exemplary embodiment for carrying out the present disclosure will be described with reference to the drawings. The fuel supply device according to the present embodiment serves to supply fuel within a fuel tank to an engine. The fuel tank is mounted on a vehicle such as an automobile equipped with an engine such as an internal combustion engine. In FIGS. 1 to 5, the frontward, rearward, rightward, leftward, upward and downward directions respectively correspond to each direction of the vehicle upon which the device may be fitted. More specifically, the front-to-rear direction corresponds to the longitudinal direction of vehicle length, the left-to-right direction corresponds to the direction of a vehicle width and the up-to-down direction corresponds to a direction of vehicle height. The leftmost drawing of FIG. 5 illustrates a surrounding area of a left side connecting shaft 22(1). The middle drawing of FIG. 5 illustrates a surrounding area of a height interval restricting mechanism (interval restricting means) 108. The rightmost drawing of FIG. 5 illustrates the surrounding area of a right connecting shaft 22(2). Although the device is presented as shown in the figures of the exemplary embodiment, the fuel supply device may be oriented in any direction with respect to the front-to-rear as well as the left-to-right directions.

Figure 2:
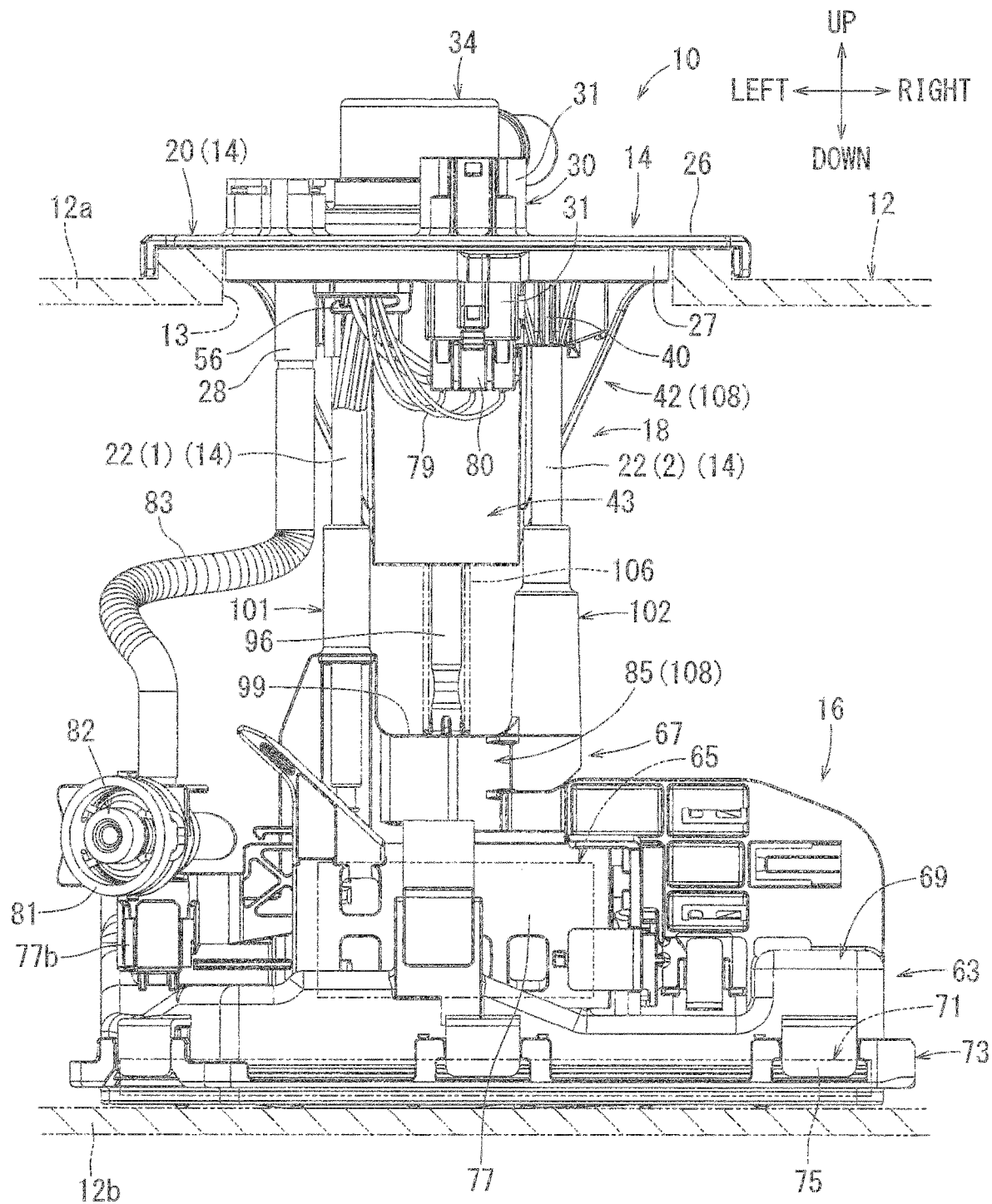
FIG. 2 is a front view of the fuel supply device of FIG. 1.
Figure 3:
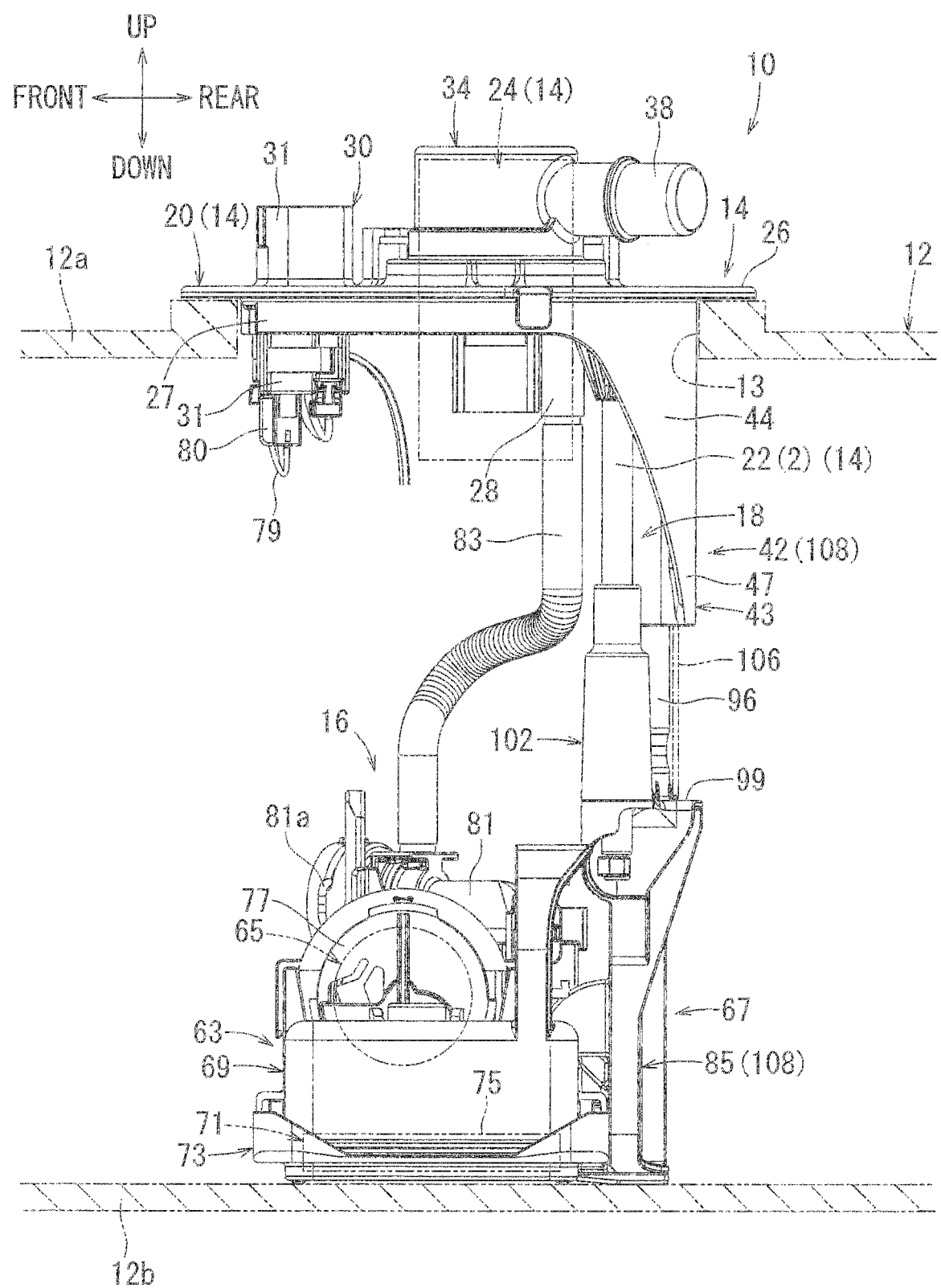
FIG. 3 is a right side view of the fuel supply device of FIG. 1.

As shown in FIGS. 2 to 3, a fuel supply device 10 is installed into a fuel tank 12. The fuel tank 12 is made of resin and is configured as a hollow container having an upper wall 12a and a lower wall 12b. A circular hole opening 13 is formed in the upper wall 12a. The fuel tank 12 is mounted onto a vehicle (not shown) with the upper wall 12a and the bottom wall 12b in a horizontal orientation (i.e. where the upper and lower wall remain parallel to the left-to-right direction). Liquid fuel such as, for example, gasoline is stored in the fuel tank 12. The fuel tank 12 may deform (expand or contract mainly in the vertical direction) in response to the variation of the internal pressure in the tank.

The fuel supply device 10 includes a flange unit 14, a pump unit (pump-side unit) 16, and a connecting mechanism 18. The flange unit (cover-side unit) 14 may include a flange main body 20, left and right side connecting shafts 22(1) and 22(2), respectively, and a fuel vapor valve 24 (see FIG. 3). The left connecting shaft 22 is denoted with reference numeral (1) and the right connecting shaft 22 is denoted with reference numeral (2).

The flange main body (cover member) 20 will be described with reference to FIGS. 14 to 16. The flange main body 20 is made of resin and is integrally formed by injection molding. The flange main body 20 comprises a circular disc-like cover plate 26, which is concentric with hole 13 when it is fit over hole 13. A cylindrical fitting tubular portion 27 is concentrically formed at a lower surface of the cover plate 26, and fits within hole 13 so as to plug it. To this end, the fitting tubular portion 27 has an outer diameter slightly smaller than the outer diameter of the cover plate 26.

Figure 4:
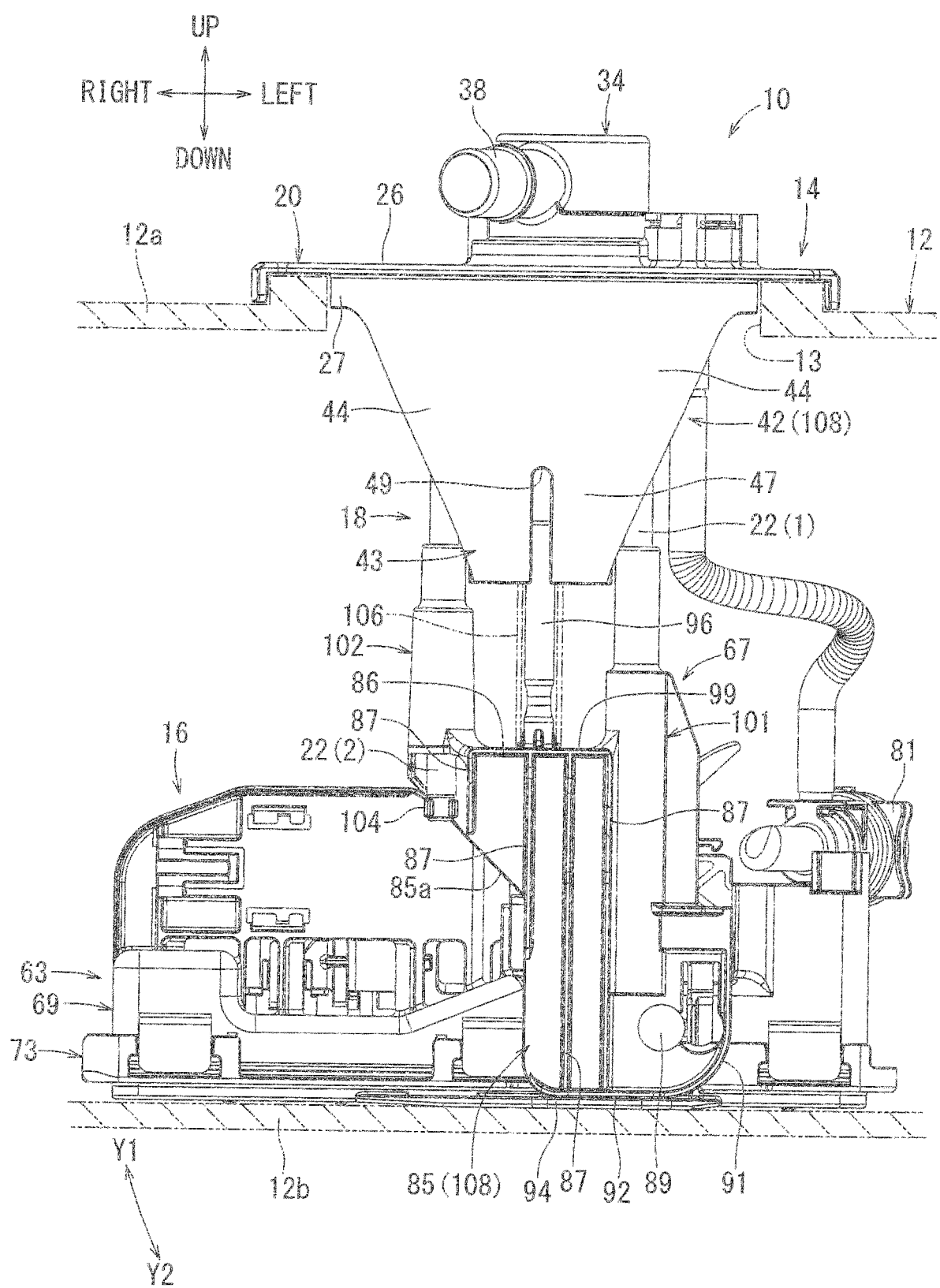
FIG. 4 is a rear side view of the fuel supply device of FIG. 1.
Figure 5:
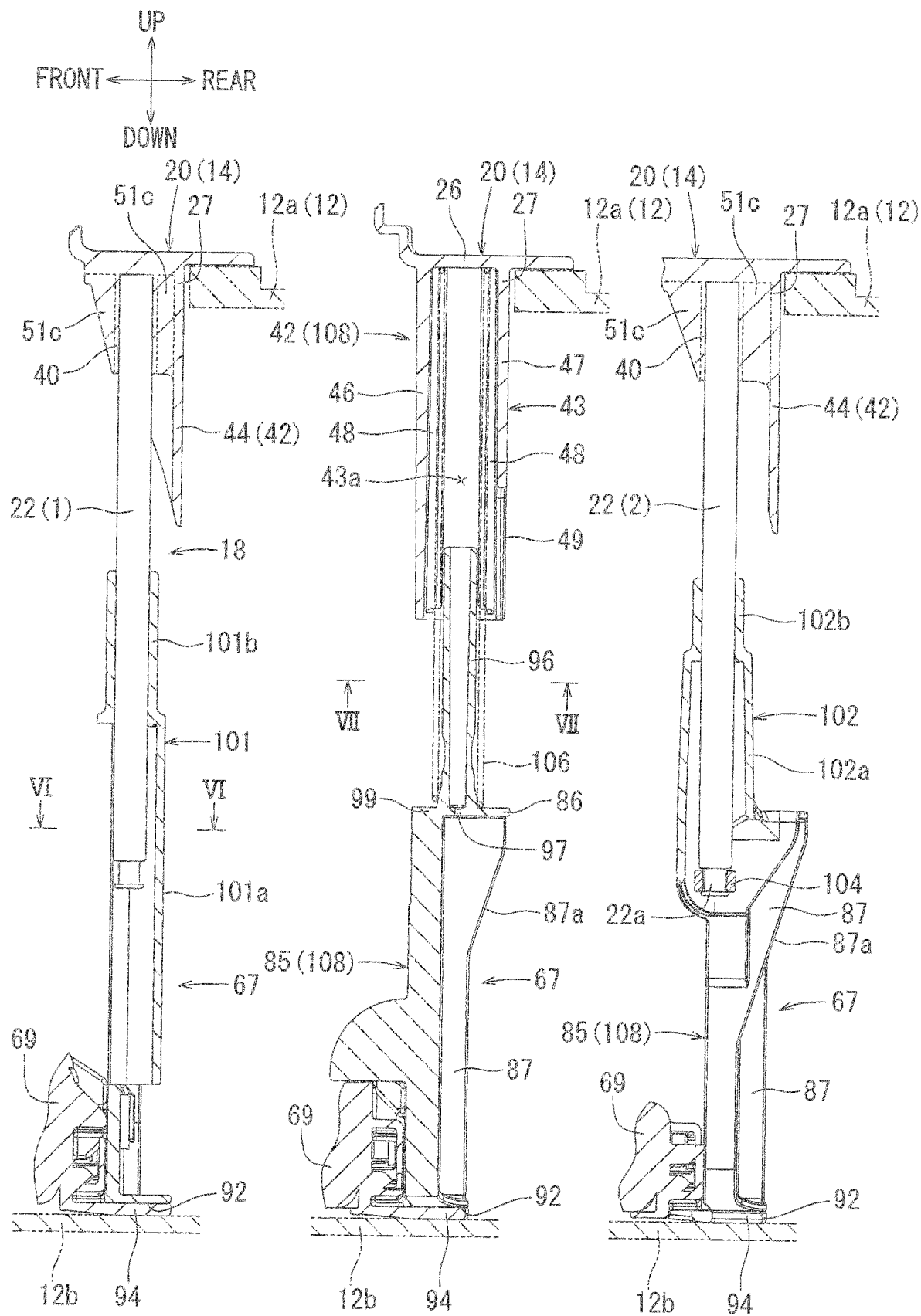
FIG. 5 is a descriptive view showing a relationship between both connecting shafts and an interval restricting mechanism of FIG. 1.

As shown in FIGS. 2 to 4, the cover plate 26 is attached to the upper wall 12a of the fuel tank 12 and fully surrounds and encloses the opening 13. The outer periphery of the cover plate 26 fits around the outer circumference of a circumferential peripheral edge of the opening 13. Further, the fitting tubular portion 27 is fitted into and plugs the opening 13 of the fuel tank 12.

Figure 14:
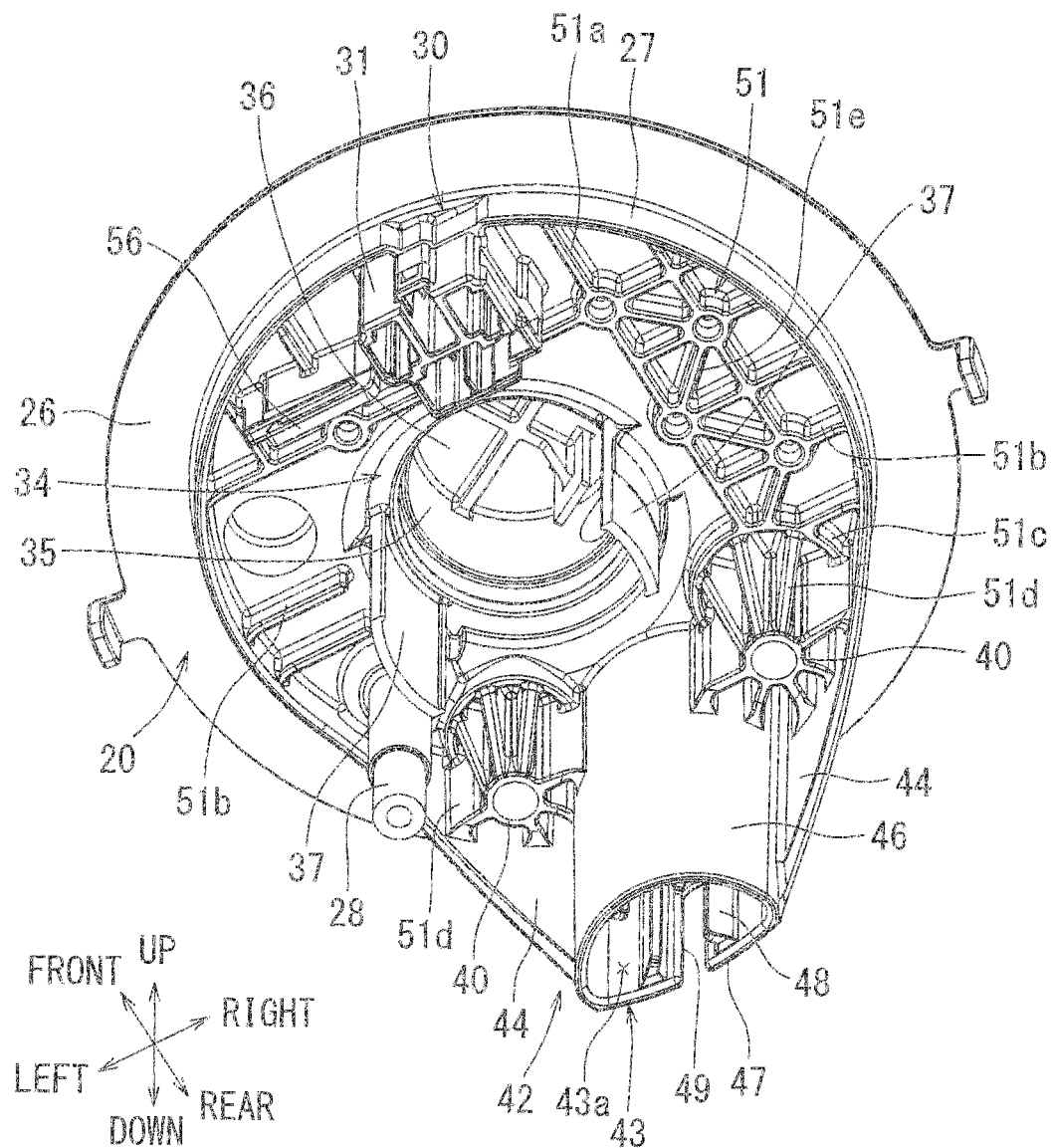
FIG. 14 is a perspective view of a flange main body of FIG. 1 as viewed from the bottom.
Figure 15:
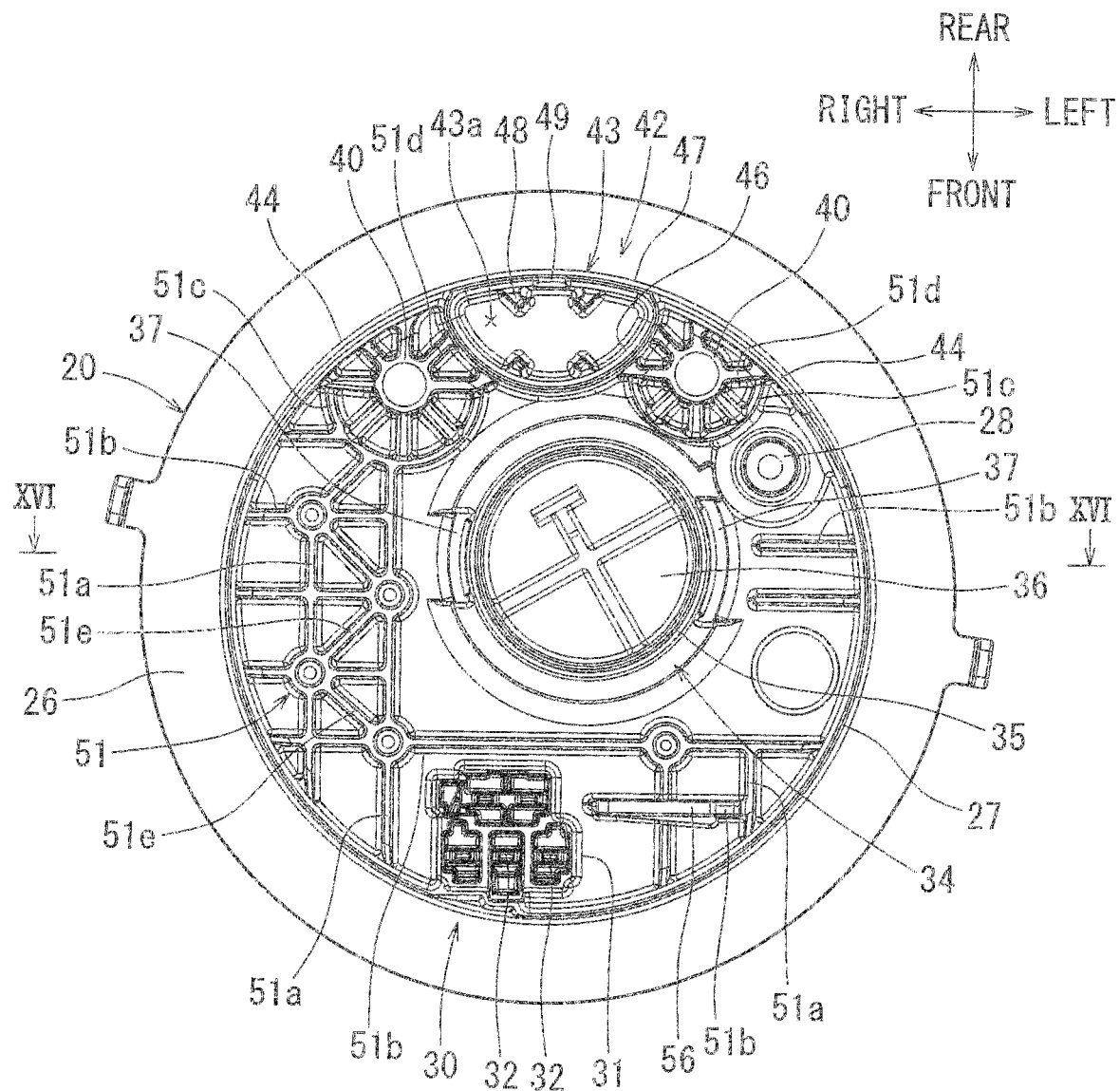
FIG. 15 is a bottom view of the flange main body of FIG. 1.

As shown in FIGS. 14 and 15, an outlet port 28 is formed on the cover plate 26. The outlet port 28 is in the form of a straight pipe protruding through both upper and lower surfaces of the cover plate 26. The outlet port 28 is located at the rear left portion of the fitting tubular portion 27 (wherein the rear-left direction corresponds to the actual upper right direction, as per the legend in FIG. 15).

An electric connector 30 is formed on the cover plate 26. The electric connector 30 includes both upper and lower rectangular connector tubular portions 31 protruding from both the upper and lower surfaces of the cover plate 26, respectively (see FIG. 3), as well as a plurality of metal terminals 32 which are embedded in the cover plate 26 by insert molding and are disposed between both of the connector tubular portions 31 (see FIG. 15). The electric connector 30 is disposed at the frontward region of the circumferential edge (lower end in FIG. 15) of the fitting tubular portion 27, touching and adjacent to said edge.

Figure 1:
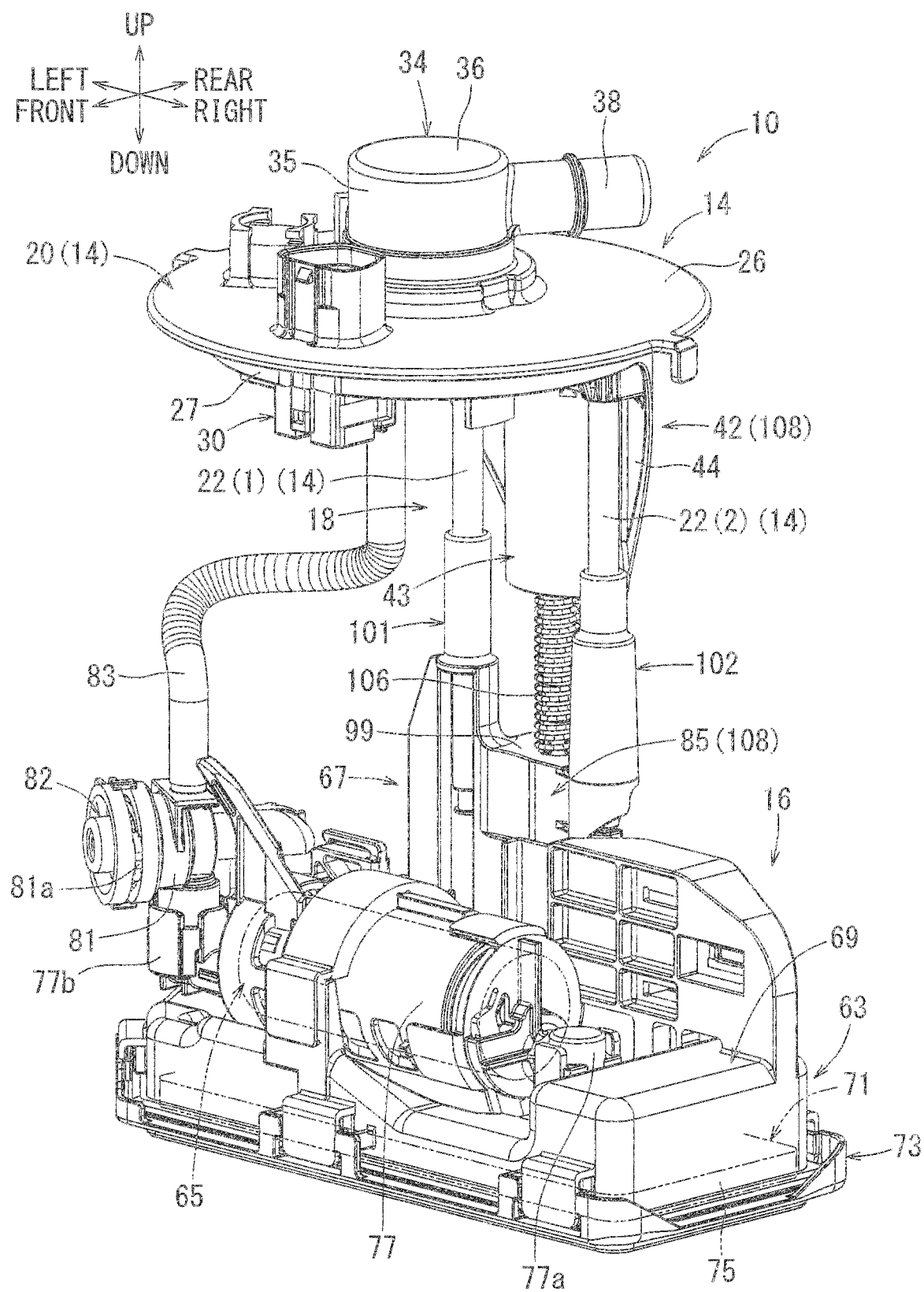
FIG. 1 is a perspective view of a fuel supply device according to one exemplary embodiment.
Figure 16:
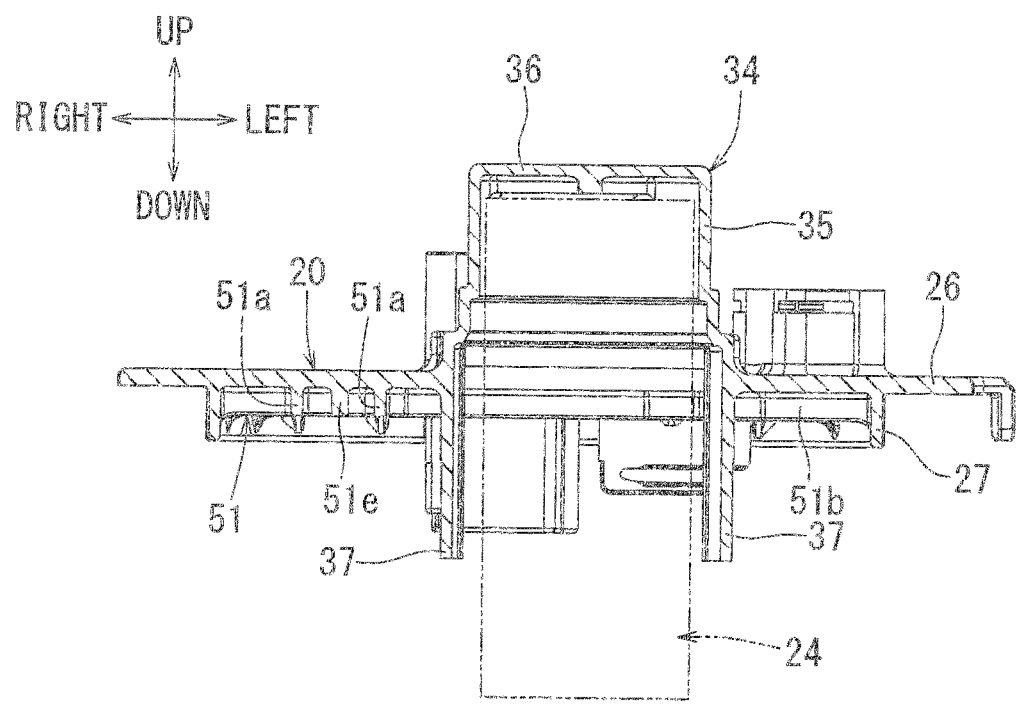
FIG. 16 is a cross-sectional view taken along line XVI-XVI in FIG. 15.

As shown in FIGS. 14 to 16, a valve accommodating portion 34 with a cylindrical shape has a top formed in the radial central portion of the cover plate 26. The valve accommodating portion 34 includes a cylindrical accommodating tubular portion 35 as well as a top panel 36, which closes an upper opening of the accommodating tubular portion 35, and a pair of both left and right attachment pieces 37 projecting downward from the accommodating tubular portion 35. The lower end of the accommodating tubular portion 35, as well as the left and right downwardly projecting attachment pieces 37, are integrally constructed with the cover plate 26 as shown in FIG. 16. As shown in FIG. 1, an evaporation port 38 extending from the central radial region obliquely rearward to the right is formed at the upper end of the accommodating tubular portion 35.

As shown in FIG. 16, the valve accommodating portion 34 is formed to accommodate the upper portion of the fuel vapor valve 24, which fits into the valve accommodating portion 34. Both of the attachment pieces (attachment portions) 37 are formed on portion 34 so that the fuel vapor valve 24 can be attached to said portion 34 by snap-fit engagement.

As shown in FIGS. 14 and 15, both a left and a right shaft attachment portion 40, each comprising a cylindrical shape with a top, are formed on the lower surface of the cover plate 26 spaced apart by a predetermined amount in the left-to-right direction. Both of the left and right shaft attachment portions 40 are arranged at the rear of the fitting tubular portion 27.

As shown in FIG. 14, a stand-off portion 42 is formed on the lower surface of the cover plate 26. The stand-off portion 42 has a supporting tubular portion 43, as well as triangular left and right walls 44 adjacent to the left and right of said portion 43. The supporting tubular portion 43 has a cylindrical shape with a top, and extends downward between both shaft attachment portions 40. The supporting tubular portion 43 has a hollow interior section 43a. A leading end surface (lower end surface) of the supporting tubular portion 43 is formed in a plane orthogonal to the central vertical axis of the supporting tubular portion 43. The supporting tubular portion 43 has an ovular cross-sectional shape in the front-rear and left-right directional plane, and the longitudinal direction of the oval is oriented in the left-to-right direction. The supporting tubular portion 43 has a front wall 46 and a rear wall 47, where both walls comprise the ovular region periphery encompassing interior region 43a.

Both of the triangular walls 44 are formed symmetrically with respect to each other about the up-to-down direction at the center of the rear wall 47 of the supporting tubular portion 43. Both of the triangular walls 44 are formed in the shape of a right-angled triangular plate, with hypotenuses continuous with both left and right side edges of the rear wall 47, where the center of the rear wall 47 lies between the side edges of the triangular walls 44. The upper edge of the front wall 46 of the supporting tubular portion 43 is integrally constructed and continuous with, and extends downward from, the cover plate 26 (see FIG. 14). The upper rear edge of the rear wall 47 of the supporting tubular portion 43 and the upper short edges of both triangular walls 44, collectively, continuously occupy approximately one third of the circumference of the fitting tubular portion 27 (see FIG. 3 and FIG. 4). More specifically, both of the short edges of the triangular walls 44 as well as the rear wall 47 are formed in a diagonally cut semi-cylindrical shape, as seen in FIG. 14, concentric with and having the same radius of curvature as that of the fitting tubular portion 27. The stand-off portion 42 extends downwardly from the flange main body 20 in a rear view (see FIG. 4) while its width is tapered and narrows as it extends further downward.

Figure 7:
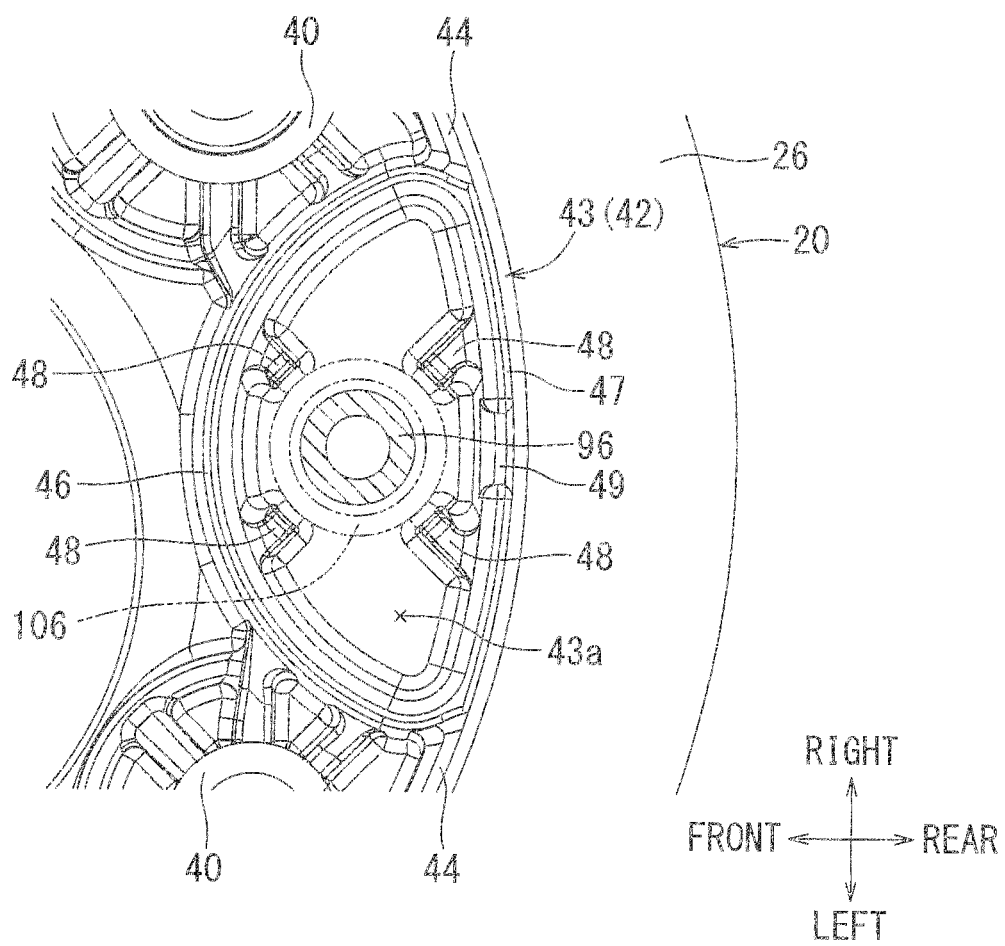
FIG. 7 is a cross-sectional view taken along line VII-VII in FIG. 5.

As shown in FIG. 7, the inner wall surface of the supporting tubular portion 43 is formed with a plurality (for example, four) of guide ribs 48 extending radially inward relative to the central axis of the supporting tubular portion 43 extending vertically in the up-down direction at the radial center of the ovular cross-section in the front-rear left-right directional plane. The guide ribs 48 are spaced apart at equal intervals in the circumferential direction, for example, at 90 degree intervals. The guide ribs 48 linearly extend in an axial direction of the supporting tubular portion 43 i.e. in the vertical direction (see the middle drawing in FIG. 5). The leading inward-most ends in the projecting direction of the guide ribs 48 are arranged on a circle around a vertically extending axis at the center of the aforementioned ovular cross section of the supporting tubular portion 43. A slit groove 49 is formed at the lower portion of the rear wall 47 of the supporting tubular portion 43 (see FIG. 4). The slit groove 49 extends linearly in the vertical direction and is formed in a split groove shape wherein the lower end surface of the rear wall 47 has an open-ended gap.

As shown in FIGS. 15 and 16, ribs 51 collectively form a grid-like shape on the back surface of the cover plate 26, in the remaining area of the plate 26 aside from the area collectively occupied by the outlet port 28, the connector tubular portion 31 of the electric connector 30, the accommodating tubular portion 35 of the valve accommodating portion 34, both of the shaft attachment portions 40, and the front wall 46 of the supporting tubular portion 43 of the stand-off portion 42. The ribs 51 have a plurality of vertical rib sections 51a, lateral rib sections 51b, annular rib sections 51c, radial rib sections 51d, and inclined rib sections 51e, respectively. The vertical rib sections 51a linearly extend in the front-to-rear direction. The lateral rib sections 51b linearly extend in the left-to-right direction. The annular rib sections 51c have a semi-annular shape surrounding and concentric with the shaft attachment portions 40. One semicircular end of each annular rib section 51c contacts with the fitting tubular portion 27, and the other semicircular end of each annular rib section 51c contacts the front wall 46. The radial rib sections 51d are formed radially between the shaft attachment portions 40 and, collectively, the annular portions defined by the fitting tubular portion 27, the front wall 46, and the annular rib sections 51c.

As shown in FIGS. 14 and 15, several of the radial rib sections 51d that are formed between the shaft attachment portions 40 and the fitting tubular portion 27 including the triangular wall regions 44, as well as several of the radial rib sections 51d formed between the shaft attachment portions 40 and the front wall 46, are formed in rectangular plate shapes extending in the axial up-down direction and the radial direction relative to the radial center of the fitting tubular portion 27 or the supporting tubular portion 43. Other radial rib sections 51d formed between the shaft attachment portions 40 and the annular rib sections 51c are respectively formed in rectangular plate shapes extending along the axial up-down direction and the radial direction relative to the radial center of the annular rib sections 50c. The inclined rib sections 51e are linearly formed so as to diagonally connect the intersections between the vertical rib sections 51*a* and the lateral rib sections 51*b* in the front-rear left-right directional plane. A hook 56 is formed at the lateral rib section 51*b* (positioned, for example, in a left area) adjacent to the electric connector 30.

As shown in FIG. 15, the ribs 51 are formed in a non-contiguous manner with both the connector tubular portion (tubular portion) 31 of the electric connector 30 and the accommodating tubular portion (tubular portion) 35 of the valve accommodating portion 34. The vertical rib sections 51*a* and the lateral rib sections 51*b* in the vicinity of the connector tubular portion 31 are formed in a non-contiguous manner with the connector tubular portion 31. The vertical rib sections 51*a*, the lateral rib sections 51*b*, and the annular rib sections 51*c* in the vicinity of the accommodating tubular portion 35 are similarly formed in a non-contiguous manner with the accommodating tubular portion 35.

Figure 17:
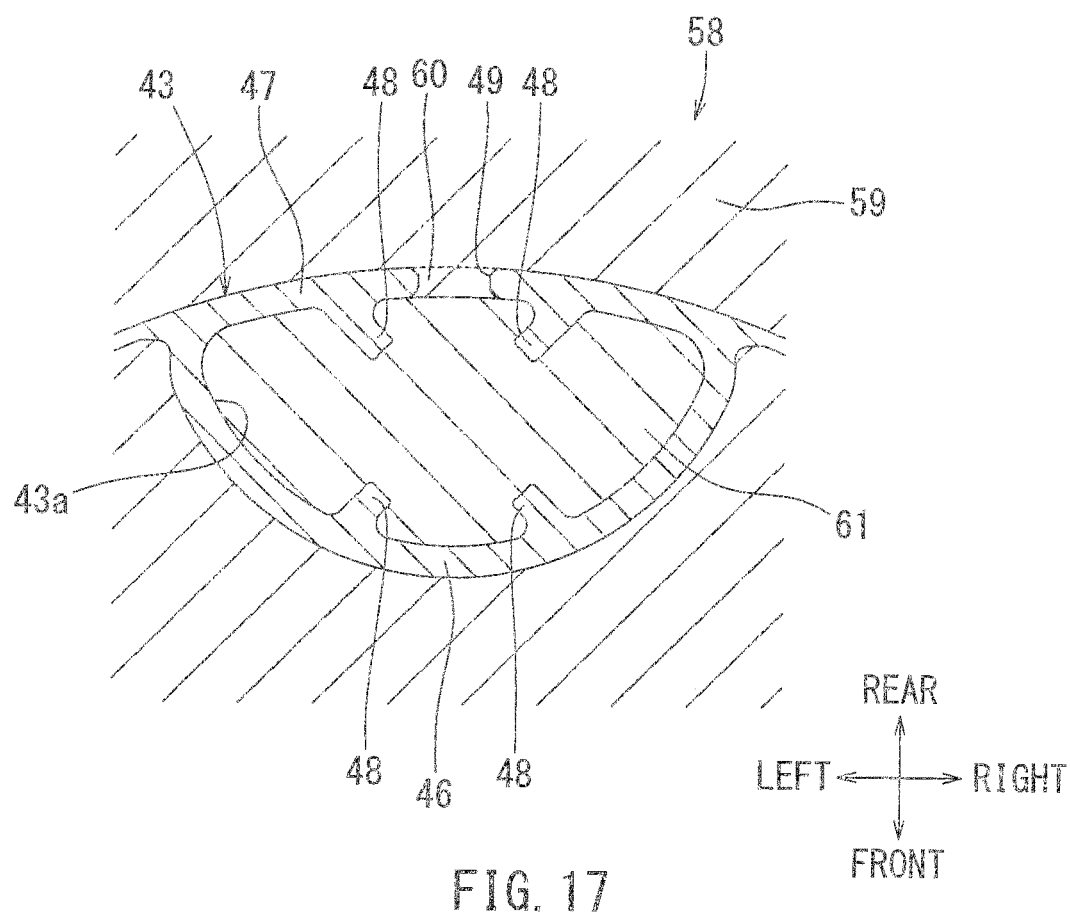
FIG. 17 is a cross-sectional view of a metal mold utilized for molding a support tubular portion of FIG. 1.
Figure 18:
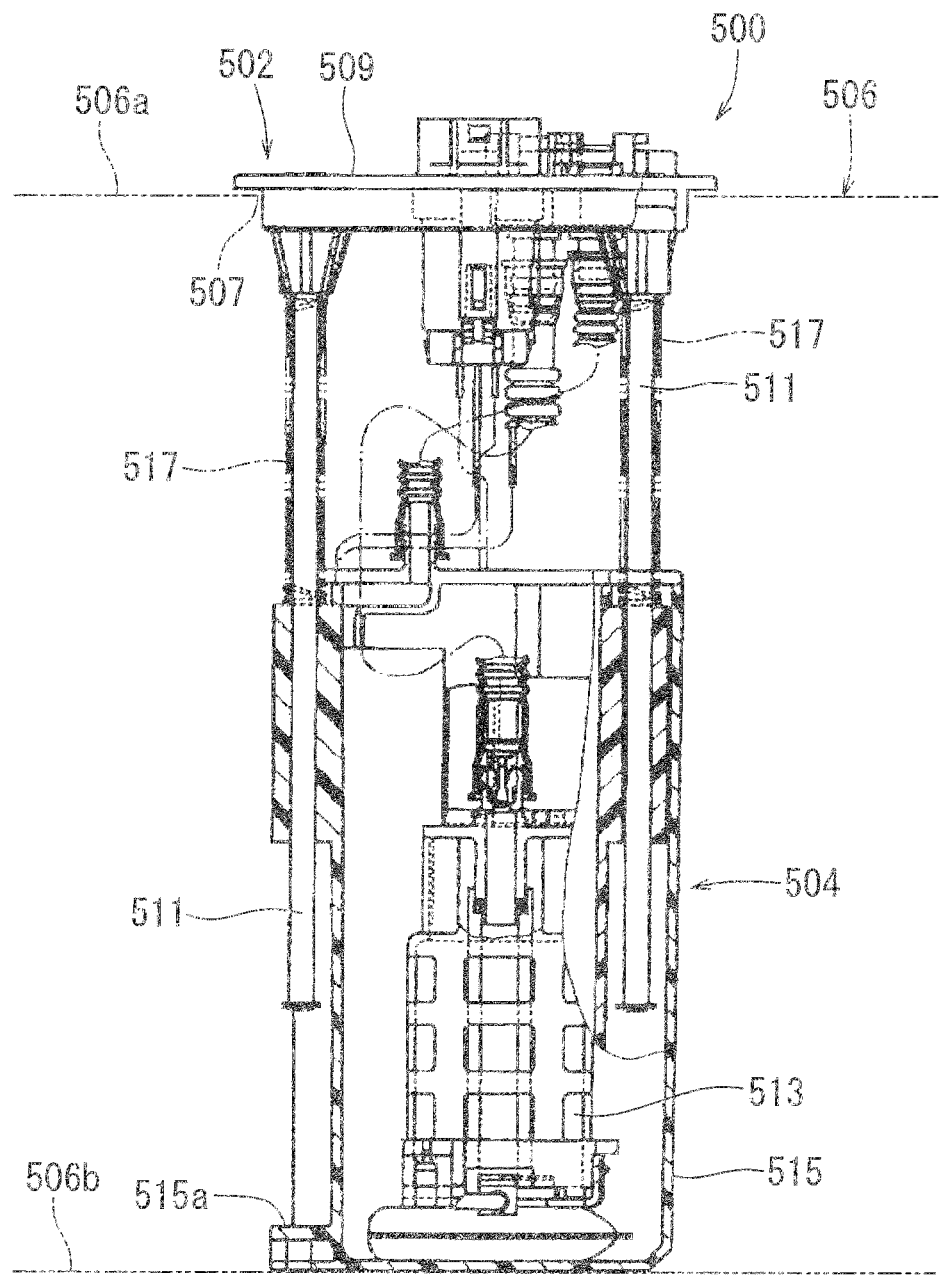
FIG. 18 is a partially removed side view of a conventional fuel supply device.

With reference to FIG. 17, a die for molding the supporting tubular portion 43 of the flange main body 20 will be described. The die 58 includes an outer die 59 for molding an outer surface of the both walls 46, 47 of the supporting tubular portion 43 and a hollow section die 61 for molding a hollow section 43*a* of the supporting tubular portion 43. The outer die 59 includes a slit groove mold part 60 at its lower end for molding the slit groove 49 of the supporting tubular portion 43. A front end surface of the slit groove mold part 60 in the protruding direction (corresponding to the front direction of the labelled legend) contacts the outer peripheral surface of the hollow section die 61, where the two surfaces face oppositely in the rear-front direction. A cooling passage through which coolant such as water or air flows is defined in the hollow section die 61, if necessary. The outer die 59 may be formed of a plurality of dies. In other embodiments, the slit groove mold part 60 may be formed as part of the hollow section die 61 instead of the outer die 59.

As shown in the left-most and right-most drawings in FIG. 5, the connecting shafts 22 may be made of metal or the like. One end (upper end) of each connecting shaft 22 is connected to the shaft attachment portions 40 of the flange main body 20 in a press-fitting configuration. Consequently, both left and right connecting shafts 22(1, 2) extend downwardly from the flange main body 20 and are positioned parallel to each other.

As shown in FIG. 16, the outer contour of the fuel vapor valve (component, valve device) 24 has a cylindrical, columnar shape. The upper portion of the fuel vapor valve 24 is fitted and accommodated within the valve accommodating portion 34 of the flange main body 20. The fuel vapor valve 24 is fixedly attached to the attachment pieces 37 of valve accommodation portion 34 by snap-fit engagement. An integrated valve including, for example, a fuel vapor control valve and a full-tank regulating valve may be used as the fuel vapor valve 24. The fuel vapor control valve closes when the internal pressure within the fuel tank 12 is lower than a predetermined value and opens when the internal pressure is greater than the predetermined value. The full-tank regulating valve opens only when the fuel tank 12 is not fully filled with fuel, and the valve remains closed when the fuel tank 12 is fully filled with the fuel.

As shown in FIGS. 2 and 3, the pump unit 16 is placed flush against the bottom wall 12*b* within the fuel tank 12 in a horizontal state in which its height in the vertical direction is at its minimum. The pump unit 16 includes a sub-tank 63, a fuel pump 65 and a joint member 67 and the like.

As shown in FIGS. 1 and 2, the sub-tank 63 includes a tank main body 69, a fuel filter 71 and a bottom cover 73. The tank main body 69 is made of resin and formed in an upside-down shallow box shape of where the lower surface is opened. The tank main body 69 is formed in an elongated rectangular shape wherein its longitudinal direction is in the left-to-right direction in a plan view. An opening is formed in the upper wall of the tank main body 69 for introducing fuel from within the fuel tank 12 into the sub-tank 63.

As shown in FIGS. 1 and 2, the fuel filter 71 includes a filter member 75. The filter member 75 is made of resin non-woven fabric or the like, is formed in an elongated rectangular shape wherein its longitudinal direction is in the left-to-right direction as seen from a plan view, and is formed as a flat shape with its vertical length being the shortest and defining the thickness direction of the rectangular prismatic shape. The filter member 75 is configured as a hollow bag shape having a hollow interior area. The filter member 75 is disposed so as to close the opening in the lower surface of the tank main body 69. An upper surface of the filter member 75 faces the internal space of the tank main body 69. Consequently, a fuel reservoir space is defined within the sub-tank 63 by the tank main body 69 and the filter member 75 at its upper and lower boundaries. Therefore, the fuel introduced into the sub-tank 63 (i.e., the fuel reservoir space) from the opening in the upper wall of the tank main body 69 can be stored within the fuel reservoir space.

Although not shown, an inner skeleton member made of resin is built in the fuel filter 75 that serves to maintain the fuel filter member 75 in an expanded state. A connection pipe made of resin is provided through the upper surface of the fuel filter member 75 allowing communication of the interior of the fuel reservoir space with the outside of the filter member 75 exterior to said space. The connection pipe and the inner skeleton member are coupled in a snap-fit configuration or the like. The connection pipe is disposed within the opening hole formed in the upper surface of the tank main body 69.

As shown in FIGS. 1 and 2, the bottom cover 73 is made of resin. It is formed in a lattice plate configuration through which the fuel can flow. The bottom cover 73 is joined to the tank main body 69 by snap-fit engagement or the like. A peripheral edge around the filter member 75 is clamped and held between the outer periphery of the tank main body 69 and the outer periphery of the bottom cover 73. Therefore, even when the bottom cover 73 contacts with the bottom wall 12*b* of the fuel tank 12, the fuel within the fuel tank 12 can be sucked into the filter member 75 from the bottom of the filter member 75 through the lattice openings of the bottom cover 73.

The fuel pump 65 shown in FIG. 1 is an electric fuel pump configured to pump fuel in and out of the fuel tank 12. The outer contour of the fuel pump 65 has a substantially columnar, cylindrical shape extending longitudinally in the left-to-right direction. The fuel pump 65 is accommodated in the pump casing 77 made of resin. The pump casing 77 is coupled to the tank main body 69 of the sub-tank 63 in a snap-fit configuration. The fuel pump 65 is disposed on the sub-tank 63 in a horizontal state (i.e., in the laterally placed state) in which the axial direction of the fuel pump 65 is oriented in the left-to-right direction.

As shown in FIGS. 2 and 3, the fuel pump 65 includes an electrical connection connector 80 that is electrically connected via a flexible wirings 79 extending into the left connecting shaft 22(1) to the fuel pump 65. The electrical connection connector 80 extends from a lower connector tubular portion 31 of the electric connector 30 on the flange main body 20 of the flange unit 14. Therefore, the power fed from the power source is supplied to the electric connector 30 and onward to the connection connector 80, through the flexible wirings 79, and to the fuel pump 65. The wirings 79 are hooked to a hook portion 56 of the flange main body 20.

As shown in FIG. 1, a suction pipe portion 77a is formed at a right end of the pump casing 77. The suction pipe portion 77a is connected to the previously described connection pipe of the fuel filter 71. The suction pipe portion 77a is connected to a fuel suction inlet (not shown) that is provided at one end (right end) of the fuel pump 65 in the left-right longitudinal axial direction of the pump 65. Therefore, after the fuel is filtered by the filter member 75, the fuel is drawn into the fuel pump 65 via the suction pipe portion 77a and the fuel suction inlet. More specifically, the filter member 75 filters fuel within the fuel tank 12 wherein the fuel is drawn from the lower side of the filter member 75 into the fuel pump 65. Filter member 75 filters the fuel drawn from within the sub tank 63 into the fuel pump 65. The filter member 75 is elongated in the left-to-right direction and has a large filtering area. Therefore, even when the upper level of the fuel within the fuel tank 12 is inclined while the vehicle drives on a curve, the fuel may remain in the filter member 75 so that the fuel pump 65 may be prevented from sucking air.

As shown in FIGS. 1 and 2, an outlet pipe portion 77b is formed at a left end of the pump casing 77. The outlet pipe portion 77b is connected to a fuel outlet (not shown) provided at the opposite left axial end (left end) along the longitudinal left-to-right axis of the fuel pump 65. A case 81 for a pressure regulator is coupled to the outlet pipe portion 77b by a snap-fit engagement or the like. The pressure regulator 82 is fitted into the case 81 while an anti-removal member 81a for preventing the removal of the pressure regulator 82 is attached to the case 81 by utilizing the elastic deformation thereof. The pressure regulator 82 serves to adjust the pressure of the fuel outlet by the pump 65 in the case 81 and discharge surplus fuel into the fuel tank 12. The case 81 for the pressure regulator is connected to the outlet port 28 at the flange main body 20 of the flange unit 14 through a flexible piping member 83 made of, for example, a hose.

As shown in FIG. 4, the joint member (joint portion) 67 is made of resin, in an integrally constructed piece which may be formed by injection molding. The joint member 67 mainly includes a connecting plate 85 that may be a vertically elongated strip plate. The connecting plate 85 has a narrower width in the left-to-right direction and its shortest dimension (thickness) in the front-to-rear direction. The connecting plate 85 has an L-shape and includes a notched recess 85a at the lower right portion (lower left portion in FIG. 4). The upper end of the connecting plate 85 is formed with a projecting plate 86 that is configured as a horizontal plate and extends in the rearward direction (see the middle drawing in FIG. 5). The front-to-rear directional width of the upper surface of the connecting plate 85 in the projecting plate 86 corresponds to the front-to-rear directional width of the supporting tubular portion 43 of the stand-off portion 42 at the flange main body 20 of the flange unit 14.

A plurality of (for example, four) projecting strip portions 87, which linearly extend downwardly from the projecting plate 86, project rearwards from the rear surface of the connecting plate 85, as shown in the rightmost and middle drawings in FIG. 5, as well as FIG. 4. The projecting width in the front-to-rear direction at the upper end of the projecting strip portions 87 with respect to the rear surface of the connecting plate 85 is determined to be the same or substantially the same as the projecting width of the projecting plate 86 in the front-to-rear direction. The projecting widths at the lower portions of the two projecting strip portions 87 on the left side (right side in FIG. 4) are determined to be approximately half of the projecting width of the projecting plate 86 (see the middle drawing in FIG. 5) in the front-to-rear direction. The inclined edges 87a define the rear ends of these two projecting strip portions 87 on the left side (right side in FIG. 4) wherein the inclined edges 87a are tapered and narrow down from their rearmost extent corresponding to the rearmost end of projecting plate 86 to their shortest length in the rear direction corresponding to half of the projecting width of the projecting plate 86. Further, inclined edges 87a (allocated the same reference numeral) also define the other two projecting strip portions 87 on the right side (left side in FIG. 4), wherein said inclined edges 87a are parallel to the inclined edges 87a of the two projecting strip portions 87 on the left side (right side in FIG. 4) and the lower ends of said inclined edges 87a are continuous with the rear end of the flat connecting plate 85, wherein said inclined edges 87a are tapered and narrow down from their rearmost extent corresponding to the rearmost end of projecting plate 86 to their shortest length in the rear direction corresponding to the rear end of the flat plate 85 below the projecting plate 86, wherein the rear end of the flat plate 85 and the inclined edge 87a is coincident for the bottom one-third of the length of the flat plate 85 in the up-to-down direction (see right drawing in FIG. 5).

As shown in FIG. 4, a lower end of the connecting plate 85 is rotatably connected to the rear side of the tank main body 69 of the sub-tank 63 by a support shaft 89 extending in the front-to-rear direction. In this way, the sub-tank 63 of the pump unit 16 is rotatably connected to the joint member 67 in the vertical direction (see directions indicated by arrows Y1 and Y2 in FIG. 4).

An arcuate surface 91 partially forming a circular arc concentric with the support shaft 89 is formed at a corner defined by the lower surface and the left surface (right surface in FIG. 4, but depicted as left, according to the legend in the figure) of the connecting plate 85. An anti-rotation surface 92 is formed at the lower surface of the right portion (left portion in FIG. 4) of the connecting plate 85 wherein the anti-rotation surface 92 lies flush against the bottom of the fuel tank 12, and is defined as a flat surface continuous with the arcuate surface 91 that is arcuately curved. A planar anti-rotation portion 94 is defined in the center (in the left-to-right direction) of the rear surface of the bottom cover 73 of the sub-tank 63. The anti-rotation portion 94 abuts the bottom wall 12b of the fuel tank 12 in a face to face surface contacting manner, flush against the bottom of fuel tank 12. Further, the anti-rotation portion 94 may abut the anti-rotation surface 92 of the connecting plate 85 when the sub-tank 63 is in a horizontal state flush against the bottom of the fuel tank 12. This configuration may restrict the sub-tank 63 from rotating from the horizontal state in the clockwise direction about the shaft 89 in the direction of Y1 as shown in FIG. 4. This state corresponds to the horizontal state of the pump unit 16. In contrast, since the arcuate surface 91 is defined on the connecting plate 85, the counterclockwise rotation of the sub-tank 63 from the horizontal state about the shaft 89 indicated by the arrow Y2 in FIG. 4 is allowed when the sub-tank 63 is suspended from the joint member 67.

As shown in the middle drawing in FIG. 5, a vertical guide pillar 96 is formed in the center in the left-to-right direction of the connection plate 85 including the projecting plate 86. The guide pillar 96 is disposed so as to be concentric with the supporting tubular portion 43 of the stand-off portion 42 of the flange unit 14, as seen in the middle drawing of FIG. 5. The outer peripheral portion at the bottom of the guide pillar 96 facing the inner peripheral portion of supporting tubular portion 43 in the vertical up-down direction constitutes a stopper portion 99, which restricts further movement of pillar 96 into the interior of 43 due to the projecting plate 86 projecting outward to a greater degree than pillar 96 in the front-to-rear direction.

As shown in the middle drawing in FIG. 5, the guide pillar 96 is formed in a hollow cylindrical configuration. A through hole 97 is formed in the projecting plate 86 comprising the stopper portion 99 and bottom surface of guide pillar 96, wherein the through hole 97 passes through the bottom surface of the guide pillar 96. As a result, the fuel is not subjected to stay in the guide pillar 96 and flows downwardly through the through hole 97 to be discharged.

As shown in FIG. 2, the connecting mechanism 18 is configured to movably connect the pump unit 16 in the vertical direction to the flange main body 20 of the flange unit 14. The connecting mechanism 18 comprises two connecting shafts 22(1) and 22(2) provided at the flange main body 20 of the flange unit 14 as well as the joint member 67 provided at the pump unit 16.

Figure 6:
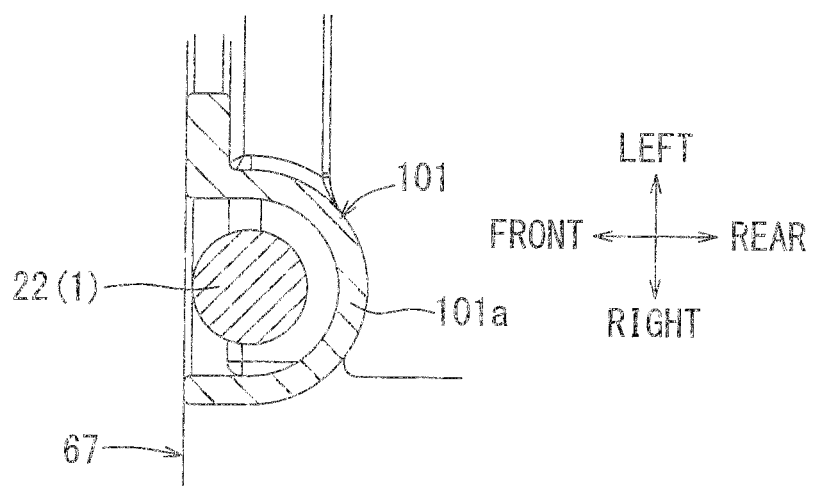
FIG. 6 is a cross-sectional view taken along line VI-VI in FIG. 5.

As shown in FIGS. 1 and 2, a left connector tubular portion (hereinafter referred to as a "first connector tubular portion") 101 and a right connector tubular portion (hereinafter referred to as a "second connector tubular portion") 102 are formed on both left and right sides of the joint member 67 and extend downward from the left connecting shaft 22(1) and right connecting shaft 22(2), respectively, parallel to each other. The hollow sections within both connector tubular portions 101, 102 correspond to shaft insertion holes. As shown in the left drawing in FIG. 5, the first connector tubular portion 101 includes a large diameter tubular portion 101a extending in the vertical direction and small diameter tubular portion 101b also extending in the vertical direction above the large tubular portion 101a and extending continuously upwards from the top of 101a, wherein the portions 101a, 101b are concentric with each other. The large diameter tubular portion 101a has a semi-cylindrical shape open towards the front portion in the front-rear left-right directional plane (see FIG. 6). A lower end of the large diameter tubular portion 101a is disposed at a position lower than the stopper portion 99 (see the middle drawing in FIG. 5, wherein the lower end of 101a in the left drawing in FIG. 5 is at a lower point, where as shown the drawings of FIG. 5 are comparable height-wise) of the joint member 67 and is opened. An upper end of the large diameter tubular portion 101a (i.e., a lower end of the smaller tubular portion 101b) is disposed at a position higher than the stopper portion 99 (see the middle drawing in FIG. 5) of the joint member 67. The small diameter tubular portion 101b is formed to have a smaller inner diameter than the inner diameter of the large diameter tubular portion 101a. The first connector tubular portion 101 is disposed to be concentric with the left connecting shaft (hereinafter, referred to as a "first connecting shaft") 22(1). The first connecting shaft 22(1) is movably or slidably inserted into the first connector tubular portion 101 in an axial direction (vertical direction), wherein the outer diameter of the left connecting shaft 22(1) approximately corresponds to the inner peripheral diameter of 101b as shown in the left drawing of FIG. 5.

As shown in the right drawing in FIG. 5, the second connector tubular portion 102 includes a large diameter tubular portion 102a extending in the vertical direction and a small diameter tubular portion 102b also extending continuously upwards in the vertical direction from the large diameter tubular portion 102a. The portions 102a and 102b are concentric with each other. A lower end of the large diameter tubular portion 102a is disposed at a higher position than the lower end of the large diameter tubular portion 101a (see the right and left drawings in FIG. 5) of the first connector tubular portion 101 but lower than the stopper portion 99 (see the middle drawing in FIG. 5) of the joint member 67 and is opened at its rear. An upper end of the large diameter tubular portion 102a (i.e., a lower end of the small diameter tubular portion 102b) is disposed at a position higher than the lower end of the smaller diameter tubular portion 101b (see the left drawing in FIG. 5) of the first connector tubular portion 101. An upper end of the smaller diameter tubular portion 102b is disposed in a position at the same level as the upper end of the small diameter tubular portion 101b (see the left drawing in FIG. 5) of the first connector tubular portion 101. The small diameter tubular portion 102b has the same inner diameter as the inner diameter of the small diameter tubular portion 101b (see the left drawing in FIG. 5) of the first connector tubular portion 101. The second connector tubular portion 102 is concentrically arranged with respect to the right connecting shaft (hereinafter, referred to as a "second connecting shaft") 22(2). The second connecting shaft 22(2) is movably or slidably inserted into the second connector tubular portion 102 in the axial direction (vertical direction), wherein the outer diameter of the right connecting shaft 22(2) approximately corresponds to the inner peripheral diameter of 102b as shown in the right drawing of FIG. 5.

A shaft anti-removal member 104 formed in a C-ring shape, made of resin, is attached to a small diameter axis portion (denoted with the reference numeral 22a) at the lower end of the second connecting shaft 22(2). The small diameter axis portion 22a is located at the lower terminal end of right connecting shaft 22(2) and has a smaller diameter than the rest of the shaft. The member 104 is attached to the small diameter axis portion 22a by utilizing elastic deformation. The outer peripheral diameter of the shaft anti-removal member 104 is smaller than the inner peripheral diameter of the large diameter tubular portion 102a of the second connector tubular portion 102, but is larger than the inner peripheral diameter of the small diameter tubular portion 102b of its connector tubular portion 102. As a result, the shaft anti-removal member 104 comes in contact with the lower end surface of the small diameter tubular portion 102b when the joint member 67 of the pump unit 16 is suspended from the flange main body 20 of the flange unit 14, and small diameter tubular portion 102b slides downward along right connecting shaft 22(2), eventually hitting anti-removal member 104 at its lower end. In this way, the joint member 67 is prevented from being removed from the second connecting shaft 22(2).

As shown in the middle drawing in FIG. 5, a lower part of a spring 106 such as a metal coil spring is fitted to coil around and fully encompass the guide pillar 96. The lower end of the spring 106 abuts the stopper portion 99 of the joint member 67. The upper portion of the spring 106 is inserted or fitted into the inner circumferential periphery of the supporting tubular portion 43 of the stand-off portion 42 of the flange main body 20 (see FIG. 7). An upper end of the spring 106 abuts a top surface of the supporting tubular portion 43 adjacent to cover plate 26. Consequently, the spring 106 is interposed between the flange main body 20 of the flange unit 14 and the joint member 67 and biasing the two components apart in the vertical direction. The spring 106 biases the flange main body 20 and the joint member 67 in a direction to enlarge the interval between them. As a result, the pump unit 16 is elastically pushed onto the bottom wall 12b of the fuel tank 12.

As shown in the middle drawing in FIG. 5, the guide pillar 96 is inserted into the spring (elastic member) 106 with a slight space between the outer circumferential periphery of the guide pillar 96 and the inner circumferential periphery of the coiled portion of spring 106. Also, the spring 106 is disposed within the support tubular portion (spring guide tubular portion) 43 of the stand-off portion 42, more specifically, in a space enclosed with a plurality of inwardly projecting guide ribs 48. As shown in FIGS. 5 and 7, a plurality of the guide ribs 48 are arranged around the spring 106 and each of the guide ribs 48 is immediately adjacent to the outer circumferential periphery of the coiled portion of the spring 106. As a result, the spring 106 is held in place with respect to its radial orientation, and is thereby guided in the axial direction by the plurality of guide ribs 48 and the guide pillar 96 when the spring 106 extends and contracts.

As shown in the middle drawing in FIG. 5, the stand-off part 42 of the flange unit 14 and the stopper portion 99 of the joint member 67 face opposite to each other in the vertical up-to-down direction with a predetermined vertical interval therebetween when the fuel supply device 10 is installed in the fuel tank 12. As shown in FIG. 2, the fuel supply piping (not shown) leading to an engine is connected to an upper end of the outlet port 28 of the flange main body 20. An external connector (not shown) is connected to the upper connector tubular portion 31 of the electric connector 30. The evaporation port 38 of the flange main body 20A is connected with a fuel vapor piping member composed of a hose leading to a canister (not shown) or the like. The canister includes adsorbents (for example, activated carbon) capable of adsorbing and desorbing fuel vapor generated within the fuel tank 12. The fuel vapor generated within the fuel tank 12 is discharged into the canister as the fuel vapor control valve of the fuel vapor valve 24 opens.

Hereinafter, the operation of the fuel supply device 10 will be described. The fuel pump 65 sucks both fuel from within the fuel tank 12 as well as fuel from within the sub-tank 63 through the fuel filter 71, and pressurizes the fuel, when the fuel pump 65 is driven by the drive power supplied from the outside through the electric connector 30 and flexible wires 79. The pressure regulator 82 regulates the pressure of the fuel and discharges the pressurized fuel into the piping member 83. Subsequently, the fuel is supplied to a vehicle engine through the outlet port 28 of the flange unit 14.

Hereinafter, a method for installing the fuel supply device 10 into the fuel tank 12 will be described. The fuel supply device 10 is brought into the extended state before it is installed in the fuel tank 12. More specifically, the pump unit 16 is brought into a state to be suspended from the flange unit 14. Rotation in the Y2 direction causes joint member 67 of the pump unit 16 to move downwardly with respect to the flange main body 20 of the flange unit 14, where as described the joint member 67 is prevented from being removed from the right connecting shaft 22(2) by the shaft anti-removal member 104. More specifically, the interval between the flange main body 20 and the joint member 67 is at its maximum in this state.

Figure 8:
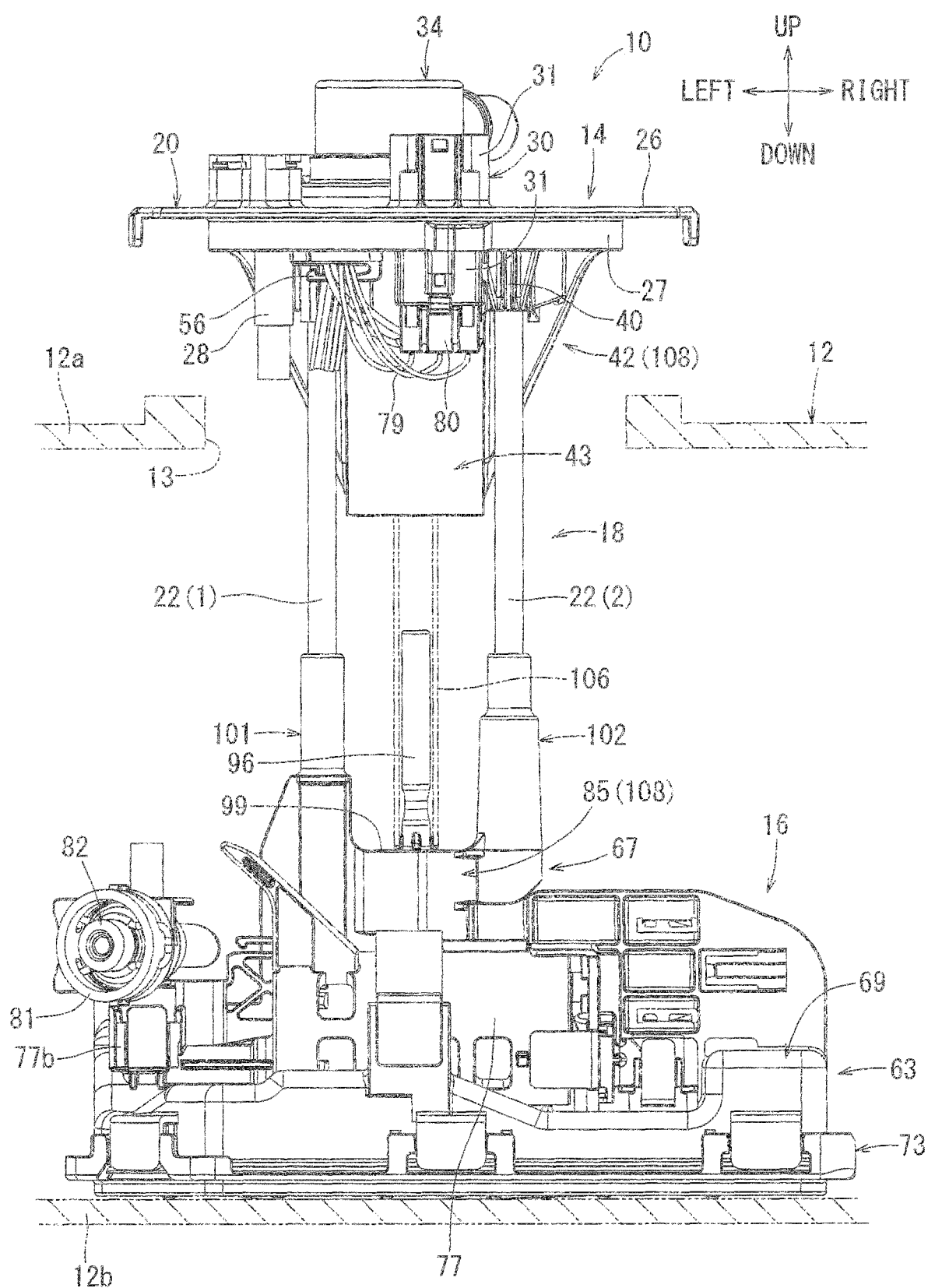
FIG. 8 is a front view of the fuel supply device of FIG. 1 during installation into a fuel tank.
Figure 9:
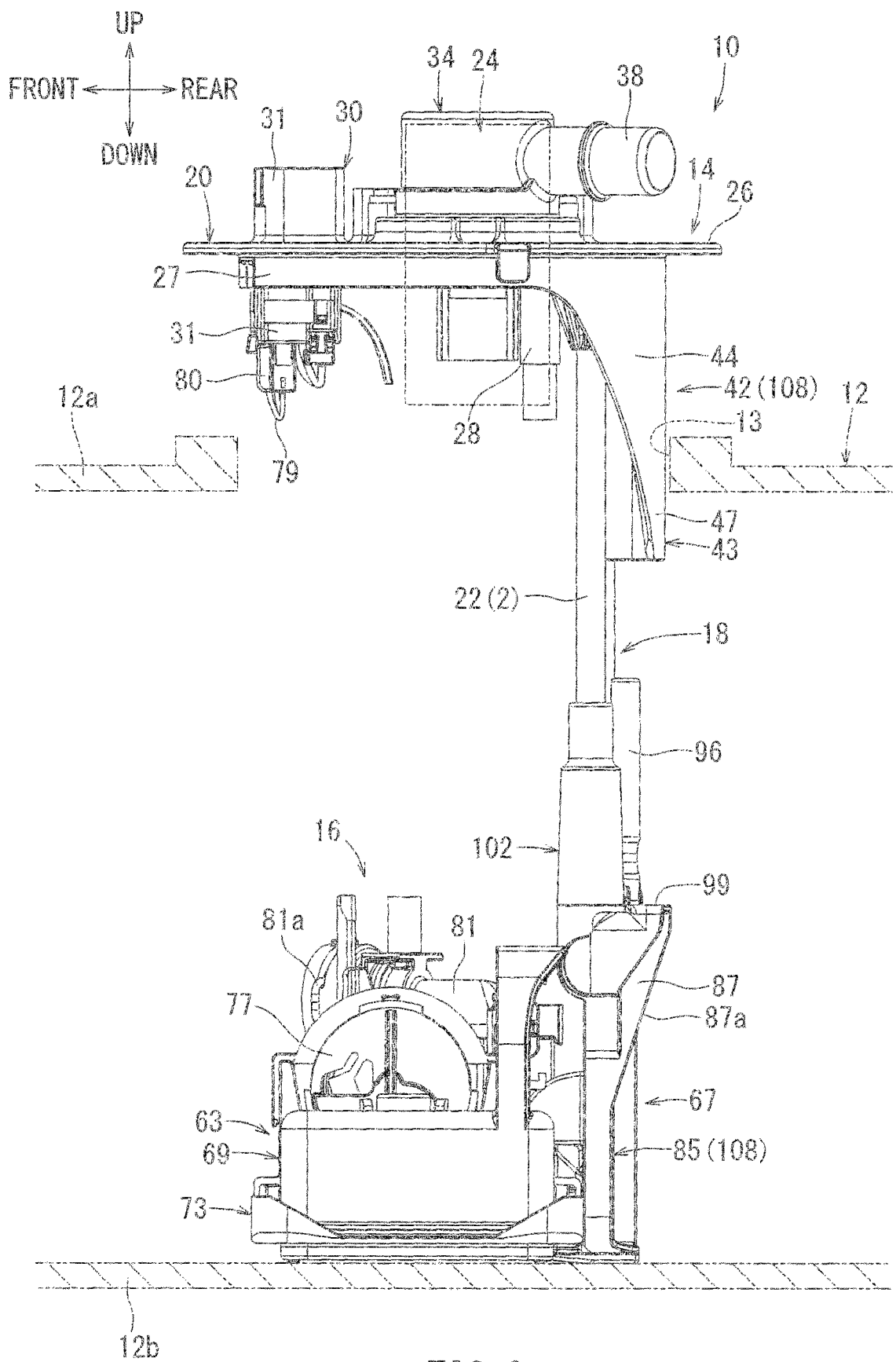
FIG. 9 is a right side view of the fuel supply device of FIG. 1 during installation into the fuel tank.
Figure 10:
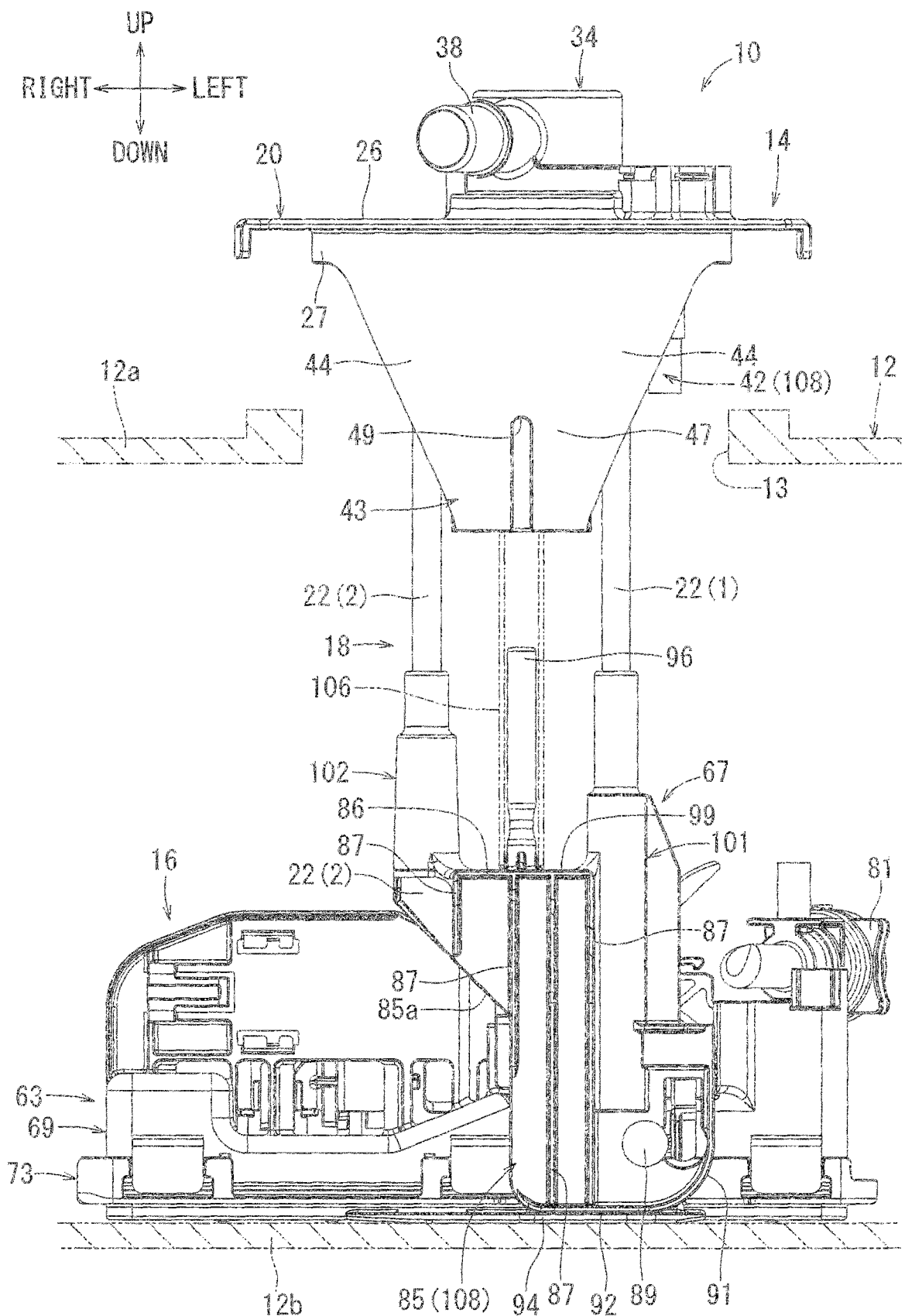
FIG. 10 is a rear side view of the fuel supply device of FIG. 1 during installation into the fuel tank.
Figure 11:
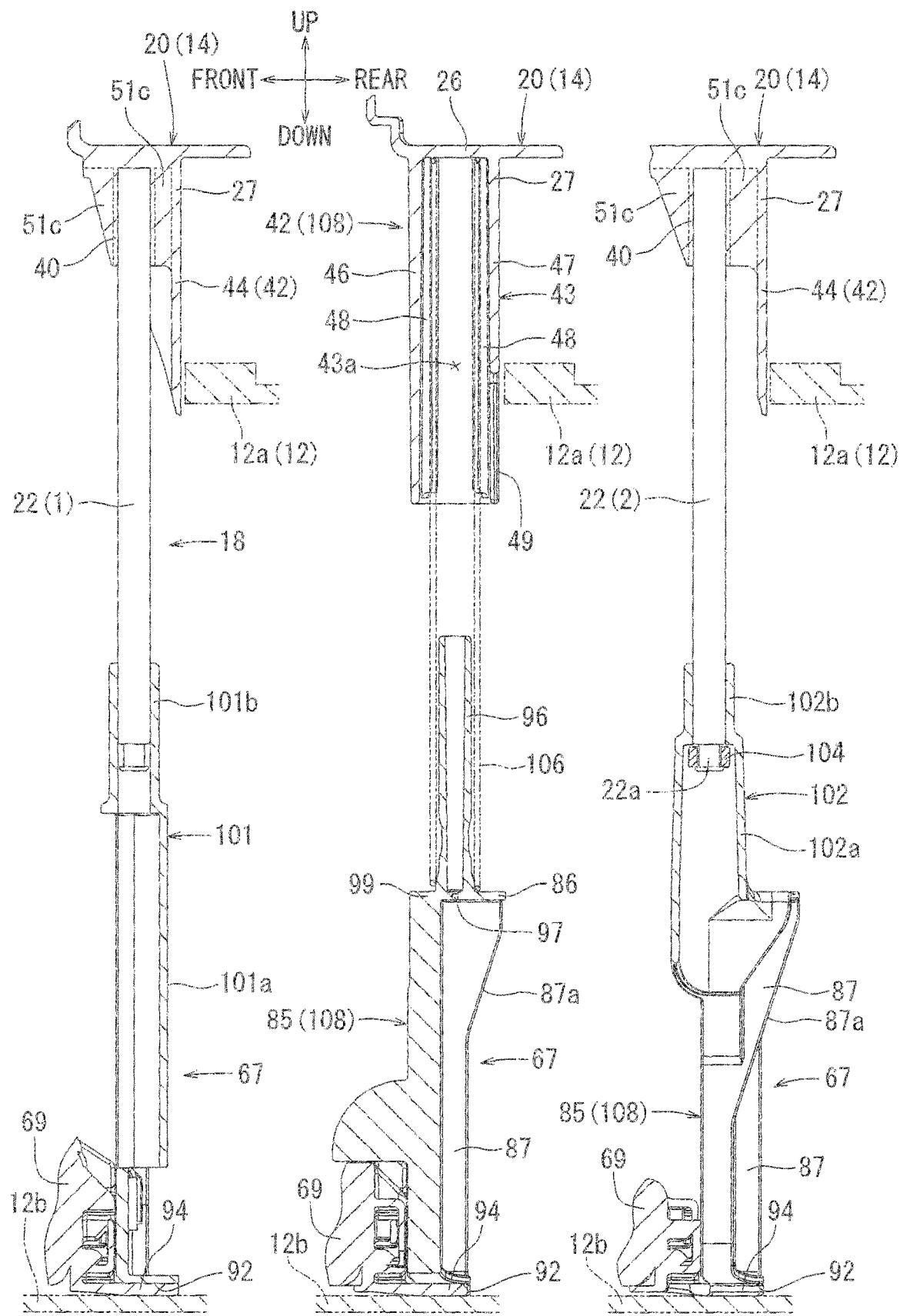
FIG. 11 is a descriptive view showing the relationship between both of the connecting shafts and the height interval restricting mechanism of FIG. 1 during installation into the fuel tank.

Subsequently, the fuel supply device 10 in this vertically maximally extended state is lowered from above and inserted into the opening 13 of the fuel tank 12. Upon contact with the bottom of the fuel tank 12b, the sub-tank 63 rotates in Y1 about the shaft 89 until it reaches the horizontal state with respect to the joint member 67 within the fuel tank 12 (see the arrow Y1 in FIG. 4), wherein the sub-tank 63 is flush against the bottom wall 12b of the fuel tank 12. Upon reaching this state, the anti-rotation surface 92 of the joint member 67 comes in contact with the anti-rotation portion 94 of the bottom cover 73 of the sub-tank 63, thereby preventing any further rotation in the Y1 direction. Thus, this configuration maintains the sub-tank 63 in the horizontal state with the bottom cover 73 of the sub-tank 63 flush with and directly abutting the bottom wall 12b of the fuel tank 12. This state is shown in FIGS. 8 to 11. The left drawing in FIG. 11 shows surrounding area of the left connecting shaft 22(1), the middle drawing shows surrounding area of an interval restricting mechanism 108, and the right drawing shows surrounding area of the right connecting shaft 22(2). In FIGS. 8 to 10, the piping member 83 shown in FIG. 2 is omitted.

As shown in FIGS. 8 and 9, the vertical interval between the flange main body 20 and the joint member 67 is maximum in the horizontal state. In this state, the connection connector 80 connected to the electric connector 30 of the flange main body 20 is positioned above the opening 13 of the fuel tank 12. Therefore, the connection connector 80 is positioned at a place where it will not interfere with the opening edge around the opening 13 of the fuel tank 12. Folded portions of the wirings 79 on the side of the connection connector 80, which are relayed through the hook 56 of the flange main body 20 onward to left connecting shaft 22(1), are also positioned at a place where they do not interfere with the opening edge around the opening 13 of the fuel tank 12.

As shown in FIGS. 9 and 10, a lower end of the supporting tubular portion 43 of the stand-off portion 42 of the flange main body 20 is positioned lower than the opening 13 of the fuel tank 12. Therefore, the lower end of the supporting tubular portion 43 of the stand-off portion 42 is positioned within and extending downward into the opening 13 of the fuel tank 12.

As shown in FIG. 9, when the fuel device 10 is being inserted downward into the tank 12, the joint member 67 may be shifted rearward (to the right in FIG. 9) with respect to the opening edge around the opening 13 of the fuel tank 12 when the pump unit 16 is inserted into the fuel tank 12. In this case, the plurality of tapered and inclined edges 87a of the projecting strip portions 87 come in contact with and smoothly slide on the opening edge around the opening 13. In this manner, the joint member 67 may be smoothly inserted into the opening 13.

Subsequently, the flange unit 14 is pushed down against the biasing force of the spring 106, which is biased towards pushing the flange unit 14 upwards in the vertical direction, while the flange unit 14 is positioned at a concentric position with the opening 13 of the fuel tank 12. At this time, the rear wall 47 and the triangular walls 44 of the supporting tubular portion 43 due to their respective narrowing and tapered shapes also serve as guides for the flange unit 14, while the flange unit 14 is inserted into the opening 13, so that it may be smoothly inserted into the opening 13.

As shown in FIGS. 2 to 5, the fitting tubular portion 27 of the flange main body 20 is fitted into the opening 13 of the upper wall 12a of the fuel tank 12. In this state, the outer periphery around the flange main body 20 of the flange unit 14 is fixed to the upper wall 12a of the fuel tank 12 by a fixing means (not shown) such as a fixing metal fitting or bolts. Consequently, the opening 13 of the fuel tank 12 may be closed while the sub-tank 63 is maintained to be pushed against the bottom wall 12b of the fuel tank 12 by the biasing force of the spring 106. As described-above, the installation of the fuel supply device 10 to the fuel tank 12 is thereby completed. In this way, the fuel supply device 10 is installed into the fuel tank 12.

Nevertheless, the fuel tank 12 may experience deformation (i.e. expansion and contraction) in response to variation of the internal pressure in the tank due to a variation of temperature and/or amount of fuel. This deformation may vary (increases and decreases) the height of the fuel tank 12 (i.e. the vertically spaced apart interval) between the upper wall 12*a* and the bottom wall 12*b*. In this case, the flange unit 14 and the pump unit 16 may move relative to each other in the vertical direction via the connecting mechanism 18 to adjust to any such deformation so that the flange unit 14 and the pump unit 16 may conform their shape to the variation of the height of the fuel tank 12. Consequently, the sub-tank 63 of the pump unit 16 is maintained to be pushed against the bottom wall 12*b* of the fuel tank 12 by a biasing force of the spring 106.

Figure 12:
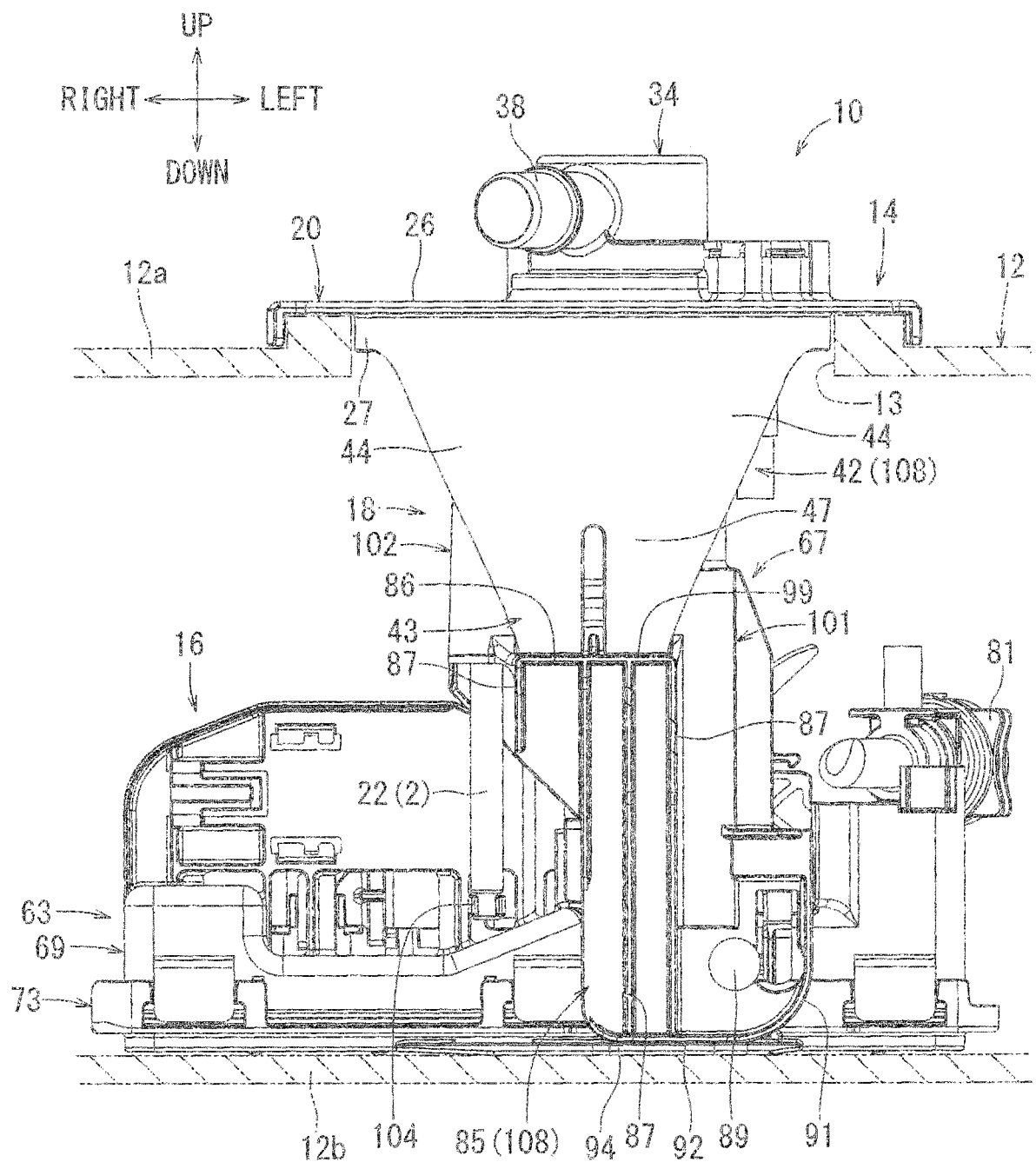
FIG. 12 is a rear side view showing the fuel supply device of FIG. 1 at its minimum height.
Figure 13:
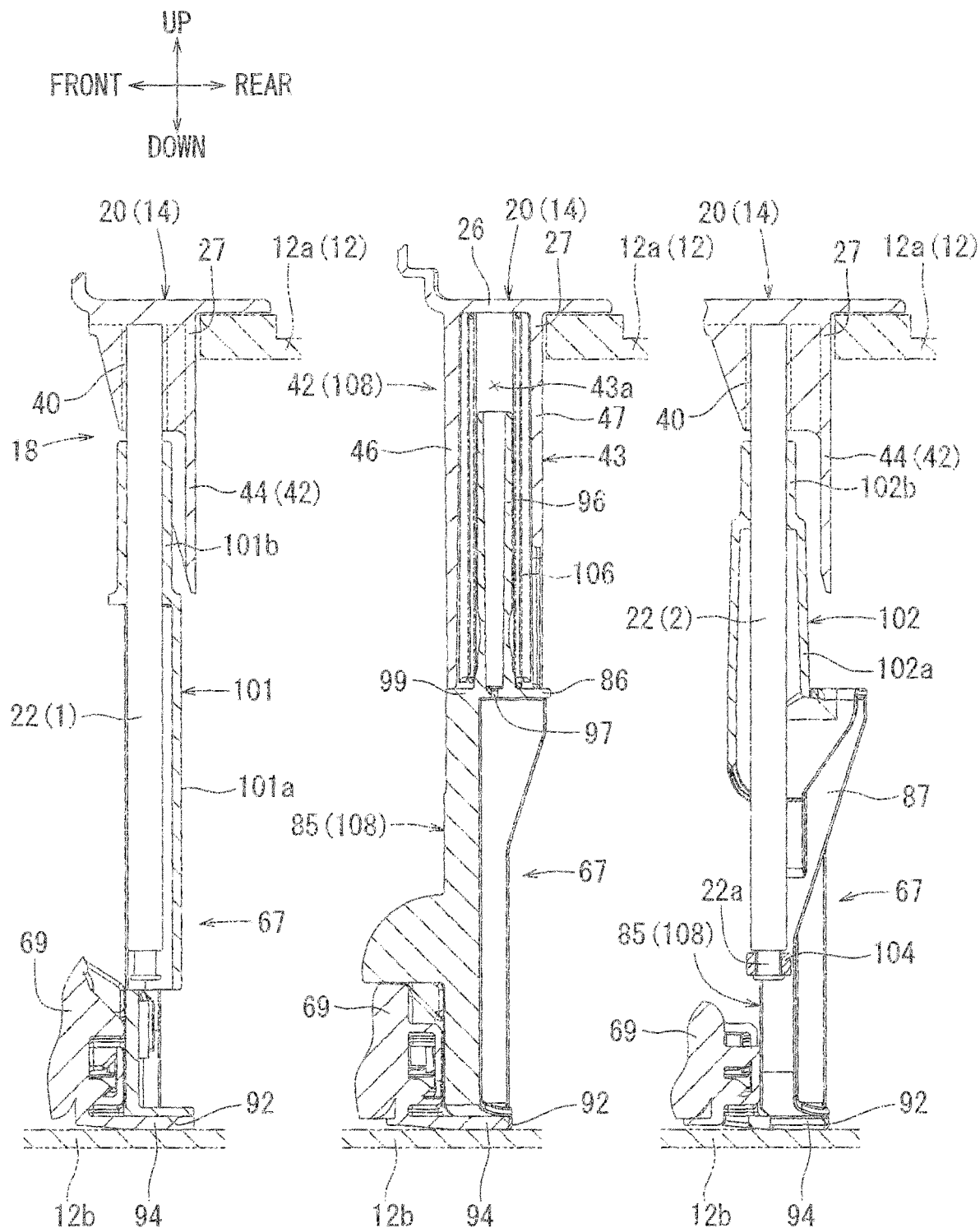
FIG. 13 is a descriptive view showing the relationship between both of the connecting shafts and the height interval restricting mechanism of FIG. 1 when the fuel supply device is at its minimum height.

As shown in FIGS. 4 and 5, the lower end of the supporting tubular portion 43 of the flange unit 14 comes in contact with the stopper portion 99 of the joint member 67 when the fuel tank 12 experiences excessive vertical contraction. This state is shown in FIGS. 12 and 13. The left drawing in FIG. 13 shows a surrounding area of the left connecting shaft 22(1), the middle drawing shows a surrounding area of the interval restricting mechanism 108 and the right drawing shows a surrounding area of the right connecting shaft 22(2).

As shown in FIG. 12 and the middle drawing in FIG. 13, in this state, the stand-off portion (upper contact portion) 42 of the flange main body 20 and the connecting plate (lower contact portion) 85 of the joint member 67 serve as a tension rod, to prevent further contraction. This configuration may thus limit the minimum vertical interval between the flange main body 20 and the joint member 67. More specifically, this configuration may define a minimum height for the fuel supply device 10. In this manner, the interval restricting mechanism 108 may comprise the stand-off portion 42 and the connecting plate 85.

With reference to FIG. 12, the stress caused by contraction when the supporting tubular portion 43 of the stand-off portion 42 contacts with the connecting plate 85 of the joint member 67 can be distributed by both of the triangular walls 44 of the stand-off portion 42, across the breadth of its surface area. The lower ends of the connecting shafts 22(1) and (2) do not interfere with the other members when the supporting tubular portion 43 contacts with the stopper portion 99 (see the left and right drawings in FIG. 13).

As show in FIGS. 12 and 13, the fuel supply device 10 includes the interval restricting mechanism 108. The interval restricting mechanism 108 includes the stand-off portion 42 and the connecting plate 85 that serve to limit the minimum vertical interval between the flange main body 20 of the flange unit 14 and the joint member 67 of the pump unit 14 as the bottom of portion 42 and the top of plate 85 reciprocally abut each other upon contraction of the tank 12. As shown, the minimum interval between the flange main body 20 and the joint member 67 can be limited by abutting the stand-off portion 42 and the connecting plate 85 each other when the fuel tank 12 is excessively contracted. The connecting shafts 22, as shown in FIG. 13, are not used as the interval restricting mechanism 108. Therefore, the deformation of the flange main body 20 due to the connecting shafts 22 can be prevented. Accordingly, it is possible to prevent the deformation of the flange main body 20 of the flange unit 14 while the excessive contraction of the fuel tank 12 in the height direction is restricted.

As shown in FIG. 12, the stand-off portion 42 is integrally formed with the flange main body 20. The connecting plate 85 forms the main body of the joint member 67. Since the two components are joined via the connecting shafts, although said shafts are not involved in mutual abutment of the two components upon contraction, the interval restricting mechanism 108 can be comprised by these two components alone, without having to increase the number of components.

As shown in FIG. 12, the stand-off portion 42 is suspended from the flange main body 20 and has tapered downward shape. With this configuration, the stress applied to the flange main body 20 is dispersed due to the shape of the stand-off portion 42 able to spread the stress due to its triangular surface area, as well as mutual abutment of the stand-off portion 42 with the connecting plate 85 of the interval restricting mechanism 108. As a result, the deformation that may be caused by the stress concentration of the flange main body 20 can be restricted.

As shown in FIG. 14, the stand-off portion 42 is configured in a diagonally cut semi-cylindrical shape. With this configuration, the stand-off portion 42 can be formed along the outer circumferential periphery of the flange main body 20.

As shown in FIG. 14, the flange main body 20 includes a fitting tubular portion 27 wherein the outer circumferential periphery of said portion fits into, and is immediately radially adjacent to the inner circumferential periphery of opening 13 of the fuel tank 12. The stand-off portion 42 is formed utilizing a part of the outer circumferential periphery of the fitting tubular portion 27. In particular, at least a part of the fitting tubular portion 27 can also be used as a part of the stand-off portion 42.

As shown in FIG. 14, the stand-off portion 42 may be formed with a vertically extending hollow section 43*a* extending inward in an upper semicircular shape in the front-rear left-right cross section, and extending in the vertical up-down direction, with the upper end projecting forward from the outer periphery of the fitting tubular portion 27. Therefore, the weight of the stand-off portion 42 may be reduced when compared with the case where the stand-off portion 42 is formed as a solid body. As shown in FIG. 5, an upper portion of the spring 106 may be fitted into the stand-off portion 42 utilizing the hollow section 43*a* of the stand-off portion 42.

As shown in FIGS. 8 and 9, the connection connector 80 of the fuel pump 65 is connected to the electric connector 30 of the flange main body 20. The connection connector 80 is arranged at a higher position than the opening 13 of the fuel tank 12 when the pump unit 16 is initially placed within the fuel tank 12 while the interval between the flange main body 20 and the joint member 67 is at its maximum. Therefore, the connection connector 80 may be prevented from being caught between the opening edge around the opening 13 of the fuel tank 12 and the flange main body 20 when the fuel supply device 10 is installed in the fuel tank 12.

As shown in the middle drawing in FIG. 5 and FIG. 7, a plurality of the guide ribs 48 projecting radially inward to the radial inner center of the ovular shape of the supporting tubular portion 43 are configured to guide the spring 106 in the axial direction, and further, are formed on the inner peripheral surface of the supporting tubular portion 43 of the stand-off portion 42. The spring 106 biases the flange main body 20 and the joint member 67 apart in the vertical up-down direction so as to move away from each other. Therefore, since the plurality of the guide ribs 48 guide the spring 106, the function for guiding the spring 106 (i.e., the function for preventing the spring 106 from buckling) can be ensured even if the length of the supporting tubular portion 43 is increased. Further, the surface area of the aforementioned ovular cross-sectional area of the hollow section 43*a* in the supporting tubular portion 43 is increased since the plurality of the guide ribs 78 are formed at the inner peripheral surface of the supporting tubular portion 43. The increase in surface area helps to ensure the strength and the durability of the hollow section die 61 shown in FIG. 17, while the moldability of the supporting tubular portion 43 can be improved even when the length of the supporting tubular portion 43 is increased by the presence of the guide ribs 78. Further, a passage for cooling can be easily formed in the hollow section die 61 by increasing the cross-sectional area of the hollow section die 61. Accordingly, the moldability of the supporting tubular portion 43 may be improved while the function for guiding the spring 106 may be ensured even if the length of the supporting tubular portion 43 of the flange main body 20 is increased. In addition, since the moldability of the supporting tubular portion 43 is increased, the accuracy in size of the supporting tubular portion 43 can be improved.

As shown in FIG. 4, an axially extending slit groove 49 is formed in the supporting tubular portion 43 of the stand-off portion 42. As shown in FIG. 17, the outer die 59 for molding the outer surface of the supporting tubular portion 43 is able to support the hollow section die 61 via the slit groove molding part 60 that forms the slit groove 49. Having the slit groove molding part 60 as part of the outer die 59 may prevent the hollow section die 61 from tilting thereby improving the accuracy in size of the supporting tubular portion 43 even when the length of the hollow section die 61 is increased.

As shown in FIG. 4, the flange main body 20 includes the fitting tubular portion 27 which is fitted into the opening 13 of the fuel tank 12. The supporting tubular portion 43 is formed utilizing a part of the fitting tubular portion 27. Therefore, a part of the fitting tubular portion 27 can also be used as a part of the supporting tubular portion 43.

As shown in FIGS. 9 and 10, the lower end of the supporting tubular portion 43 of the stand-off portion 42 is arranged at a lower position than the opening 13 of the fuel tank 12 when the pump unit 16 is initially placed within the fuel tank 12 while the vertical interval between the flange main body 20 and the joint member 67 is at its maximum. Therefore, the spring 106 may be prevented from contacting the opening edge around the opening 13 of the fuel tank 12 when installing the fuel supply device 10 into the fuel tank 12. In this way, this structural configuration prevents the installation of the device 10 into the fuel tank 12 from generating noise and damage around the opening 13 that may be caused by the contacting of the spring 106 with the opening edge around the opening 13 of the fuel tank 12.

As shown in FIG. 15, the connector tubular portion 31 of the electric connector 30 is formed to be non-contiguous with the ribs 51 of the cover plate 26. Therefore, the tensile stress caused by the flexural deformation of the flange main body 20 is not applied from the ribs 51 to the base portion of the connector tubular portion 31. As a result, the concentration of stress applied to the ribs 51 does not traverse to the connector tubular portion 31 of the flange main body 20.

As shown in FIG. 15, the accommodating tubular portion 35 of the valve accommodating portion 34 is formed to be non-contiguous with the ribs 51 of the cover plate 26. Therefore, the tensile stress caused by the flexural deformation of the flange main body 20 is not applied from the ribs 51 to the base portion of the accommodating tubular portion 35. As a result, similar to above, the concentration of stress applied to the ribs 51 does not traverse to the accommodating tubular portion 35.

As shown in FIGS. 14 and 16, the fuel vapor valve 24 may be accommodated in the accommodating tubular portion 35 of the valve accommodating portion 34, and the fuel vapor valve 24 may be attached to the attachment pieces 37.

The present invention is not limited to the exemplary embodiments but may be modified without departing from the scope of the present invention. For example, the present invention may not be limited to be applied to the fuel supply device 10 for a vehicle such as an automobile but may also be applied to a fuel supply device for the other vehicles. Further, the number of components provided for each of the units 14 and 16 for the fuel supply device 10 may be appropriately increased or reduced and/or the components may be modified. Further, the joint member 67 may be fixed to the pump casing or the tank main body 69 of the sub-tank 63, or may be integrally formed with the pump casing or the tank main body 69 of the sub-tank 63. The pump-side unit may not be limited to the pump unit 16 of the exemplary embodiments, but may be of the type having a cup-like sub-tank and the fuel pump disposed within the sub-tank. The connecting mechanism 18 may be appropriately modified as far as it is configured as a mechanism for connecting the joint member 67 to the flange main body 20 so as to be movable in the vertical direction.

The configuration of the stand-off portion 42 and/or the connecting plate 85 for the interval restricting mechanism 108 may also be appropriately modified. For example, both of the triangular walls 44 may be omitted so that the stand-off portion 42 may be formed merely with the supporting tubular portion 43. Additionally, the stand-off portion 42 may be formed as a separate construction from the fitting tubular portion 27. The supporting tubular portion 43 is not limited to have an ovular cross-section but may be modified to have a cylindrical cross-section, a rectangular tubular cross-section, C-shaped cylindrical cross-section or the like. The supporting tubular portion 43 as a "pillar portion" in the present specification, instead of being hollow, may be formed to have a solid body or as a plate. The front wall 46 of the supporting tubular portion 43 may be omitted. In this case, the supporting tubular portion 43 may be formed to have a cylindrical cross-section not a semicircular cross-section, and would be formed in a diagonally cut cylindrical shape utilizing the entire fitting tubular portion 27. The stand-off portion 42 may be formed in a trapezoidal shape such as a truncated pyramid, truncated cone, or the like. The connecting plate 85, particularly an upper portion which contacts and reciprocally abuts the lower portion of the stand-off portion 42, may be formed in a trapezoidal shape such as a truncated pyramid, truncated cone, or the like.

Valve devices except the fuel vapor valve 24 or components other than the valve device may be used as a component that can be accommodated in the valve accommodating portion 34. Different components from the attachment pieces 37 may be used for attaching the fuel vapor valve 24 to the accommodating tubular portion 35 of the valve accommodating portion 34.

The various exemplary embodiments described above in detail with reference to the accompanying drawings are intended to be representative of the present invention and thus non limiting embodiments. The detailed description is intended to teach a person of skill in the art to make, use and/or practice various aspects of the present teachings and thus does not limit the scope of the invention in any manner.

Furthermore, each of the additional features and teachings disclosed above may be applied and/or used separately or with other features and teachings in any combination thereof, to provide improved fuel supply devices and/or methods of making and using the same.

What is claimed is:

1. A fuel supply device comprising:
a cover-side unit including a disc-shaped cover member configured to close a circular opening formed in an upper wall of a fuel tank;
a pump-side unit including a fuel pump, a tank main body, a fuel filter, and a bottom cover, wherein the tank main body is formed in an elongated rectangular upside-down shallow box shape elongated longitudinally in a left-to-right direction with a lower surface having an opening, wherein the pump-side unit is configured to be disposed within the fuel tank flush against a bottom surface of the fuel tank, wherein the pump-side unit includes a joint portion comprising a connecting plate rotatably connected to the tank main body about a rotatable shaft wherein the joint portion is movably coupled to the cover member of the cover-side unit in a vertical direction; and
an interval restricting mechanism including an upper abutment portion and a lower abutment portion, wherein the cover member includes the upper abutment portion and the joint portion includes the lower abutment portion, wherein the upper abutment portion is suspended from the cover member and has a shape that is tapered downwardly, wherein the interval restricting mechanism is configured to restrict a vertical interval between a top of the cover member and a bottom of the joint portion by abutment of the upper abutment portion and the lower abutment portion at a minimum vertical interval
wherein the connecting plate of the joint portion has an arcuate surface at its left-downward end or right-downward end, wherein the arcuate surface partially forms a circular arc, and
wherein the circular arc is concentric with the rotatable shaft of the joint portion, wherein an anti-rotation surface is formed at a bottom portion of the connecting plate to the right or left of the circular arc and on a side opposite to the arcuate surface.

2. The fuel supply device of claim 1, wherein a planar anti-rotation surface is defined at a center in the left-to-right direction of a rear surface of the bottom cover of the pump-side unit, such that when the pump-side unit lies horizontally uninclined with respect to the left-to-right direction flush against the bottom of the fuel tank, the anti-rotation surface of the bottom cover contacts the anti-rotation surface of the connecting plate to restrict the device from rotation in the clockwise direction about the rotatable shaft.

3. A fuel supply device comprising:
a cover-side unit including a disc-shaped cover member configured to close a circular opening formed in an upper wall of a fuel tank;
a pump-side unit including a fuel pump, a tank main body, a fuel filter, and a bottom cover, wherein the tank main body is formed in an elongated rectangular upside-down shallow box shape elongated longitudinally in a left-to-right direction with a lower surface having an opening, wherein the pump-side unit is configured to be disposed within the fuel tank flush against a bottom surface of the fuel tank, wherein the pump-side unit includes a joint portion comprising a connecting plate rotatably connected to the tank main body about a rotatable shaft, wherein the joint portion is movably coupled to the cover member of the cover-side unit in a vertical direction; and
an interval restricting mechanism including an upper abutment portion and a lower abutment portion, wherein the cover member includes the upper abutment portion and the joint portion includes the lower abutment portion, wherein the upper abutment portion is suspended from the cover member and has a shape that is tapered downwardly, wherein the interval restricting mechanism is configured to restrict a vertical interval between a top of the cover member and a bottom of the joint portion by abutment of the upper abutment portion and the lower abutment portion at a minimum vertical interval
wherein the upper abutment portion projects vertically downward from the cover member and has an upside down triangular shape with a split groove at an apex of the triangular shape in the up-down and left-right cross sectional plane.

4. The fuel supply device of claim 3, wherein the disc-shaped cover member comprises a fitting tubular portion fitted into the opening of the fuel tank, wherein a longest side of the triangular shape constitutes part of a circumferential periphery of the fitting tubular portion.

* * * * *